US012696163B2

(12) United States Patent
Zhang et al.

(10) Patent No.: US 12,696,163 B2
(45) Date of Patent: Jul. 28, 2026

(54) INFORMATION OBTAINING METHOD, PROCESSING METHOD, NODE, NETWORK DEVICE AND APPARATUS

(71) Applicant: DATANG MOBILE COMMUNICATIONS EQUIPMENT CO., LTD., Beijing (CN)

(72) Inventors: Mingzhu Zhang, Beijing (CN); Nan Yan, Beijing (CN); Erlin Zeng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 310 days.

(21) Appl. No.: 18/264,035

(22) PCT Filed: Jan. 24, 2022

(86) PCT No.: PCT/CN2022/073538
§ 371 (c)(1),
(2) Date: Aug. 2, 2023

(87) PCT Pub. No.: WO2022/166659
PCT Pub. Date: Aug. 11, 2022

(65) Prior Publication Data
US 2024/0098604 A1 Mar. 21, 2024

(30) Foreign Application Priority Data
Feb. 3, 2021 (CN) .......................... 202110150460.2

(51) Int. Cl.
| | |
|---|---|
| *H04W 36/30* | (2009.01) |
| *H04W 40/02* | (2009.01) |
| *H04W 76/18* | (2018.01) |

(52) U.S. Cl.
CPC ......... *H04W 36/305* (2018.08); *H04W 40/02* (2013.01); *H04W 76/18* (2018.02)

(58) Field of Classification Search
CPC . H04W 76/19; H04W 84/047; H04W 36/305; H04W 88/085; H04W 76/18;
(Continued)

(56) References Cited

U.S. PATENT DOCUMENTS

| | | | | |
|---|---|---|---|---|
| 11,638,319 B2 * | 4/2023 | Jeon | .................. | H04L 45/28 |
| | | | | 370/216 |
| 12,167,490 B2 * | 12/2024 | Ishii | ............... | H04W 76/19 |
(Continued)

FOREIGN PATENT DOCUMENTS

| | | |
|---|---|---|
| CN | 111565408 A | 8/2020 |
| CN | 111757362 A | 10/2020 |
(Continued)

OTHER PUBLICATIONS

Extended European Search Report issued on Jun. 21, 2024 for European Patent Application No. 22748938.2.
(Continued)

*Primary Examiner* — Dung Hong
(74) *Attorney, Agent, or Firm* — Ladas & Parry, LLP

(57) ABSTRACT

The present application discloses an information obtaining method, an information processing method, a node, a network device and an apparatus. The information obtaining method applied to a first node includes: in a case that an RLF is detected for a second node, receiving an indication related to the RLF of the second node sent by the second node, wherein the second node is a parent node of the first node; obtaining first parameter information of the indication.

14 Claims, 8 Drawing Sheets in a case that an RLF is detected for a second node, receiving an indication related to RLF of the second node sent by the second node ⟋401 obtaining first parameter information of the indication ⟋402

(58) Field of Classification Search
CPC ..... H04W 40/22; H04W 24/04; H04W 88/14; H04W 76/15; H04W 40/02
See application file for complete search history.

(56) References Cited

U.S. PATENT DOCUMENTS

| | | | | |
|---|---|---|---|---|
| 12,207,107 | B2 * | 1/2025 | Hwang | H04W 76/38 |
| 2015/0208295 | A1 | 7/2015 | Da Silva et al. | |
| 2020/0092784 | A1 * | 3/2020 | Hampel | H04W 40/22 |
| 2020/0267795 | A1 * | 8/2020 | Jung | H04W 36/16 |
| 2021/0195675 | A1 * | 6/2021 | Park | H04W 24/00 |
| 2021/0315040 | A1 * | 10/2021 | Wu | H04W 76/19 |
| 2021/0377757 | A1 * | 12/2021 | Liu | H04L 1/1896 |
| 2021/0378041 | A1 * | 12/2021 | Narasimha | H04W 76/19 |
| 2022/0015011 | A1 * | 1/2022 | Liu | H04W 36/305 |
| 2022/0070959 | A1 * | 3/2022 | Jung | H04W 24/04 |
| 2022/0132337 | A1 * | 4/2022 | Muhammad | H04W 24/04 |
| 2022/0174772 | A1 | 6/2022 | Luo et al. | |
| 2022/0255689 | A1 * | 8/2022 | Wen | H04W 24/10 |

FOREIGN PATENT DOCUMENTS

| | | | |
|---|---|---|---|
| WO | 2019/192605 | A | 10/2019 |
| WO | 2020/059633 | A | 3/2020 |
| WO | 2020192603 | A1 | 10/2020 |

OTHER PUBLICATIONS

Office Action and search report issued on Aug. 23, 2024 for Chinese Patent Application No. 202110150460.2 and its English translation provided by Applicant's foreign counsel.

ZTE, Senechips: "Discussion on IAB BH RLF Handling", 3GPP TCG RAN WG2 Meeting # 107, R2-1909627; Prague, Czech Republic, Aug. 26-30, 2019.

Futurewei; "Ran2 impacts of Rel. 17 IAB Topology Adaptation Enhancements", 3GPP TCG RAN WG2 Meeting # 112, R2-2010490 (Revision R2-2007984), Online, Nov. 2020.

International Search Report for PCT/CN2022/073538 issued on Apr. 13, 2022 and its English Translation provided by WIPO.

Written Opinion for PCT/CN2022/073538 issued on Apr. 13, 2022 and its English Translation provided by WIPO.

International Preliminary Report on Patentibily for PCT/CN2022/073538 issued on Aug. 3, 2023 and its English translation provided by WIPO.

"BH link failure handling," 3GPP TSG-RAN WG2 Meeting #107bis, R2-1913460 Resubmission of R2-1910043, Chongqing, China, Oct. 14-18, 2019, Agenda item: 6.1.5.1, Source: Nokia, Nokia Shanghai Bell, all pages.

* cited by examiner

Receiving parameter information of an indication related to an RLF of the second node — 601

Optimizing the topology structure according to the parameter information — 602

INFORMATION OBTAINING METHOD, PROCESSING METHOD, NODE, NETWORK DEVICE AND APPARATUS

CROSS-REFERENCE TO RELATED APPLICATIONS

This application is the U.S. national phase of PCT Application No. PCT/CN2022/073538 filed on Jan. 24, 2022, which claims priority to the Chinese patent application No. 202110150460.2 filed on Feb. 3, 2021 with the title of "information obtaining method, processing method, node, network device and apparatus", the disclosures of which are incorporated herein by reference in their entireties.

TECHNICAL FIELD

The present application relates to the field of communication technology, in particular to an information obtaining method, a processing method, a node, a network device and an apparatus.

BACKGROUND

As shown in FIG. 1 and FIG. 2, in the integrated access backhaul (IAB) network architecture, the IAB node can support the wireless relay of the next generation radio access network (NG-RAN). Among them, the relay node (that is, the IAB node) supports access and backhaul through the new air interface (NR). The termination node of the NR backhaul on the network side is the IAB-donor, and the backhaul can go through one or more hops. Among them, in FIG. 1, AMF represents the access and mobility management function network element, UPF represents the user plane function network element, gNB represents the 5G base station, and NG, Xn, NR Uu, and F 1 represent interfaces respectively. In FIG. 2, MME represents the mobility management entity, S-PGW represents the interface connected to the data gateway, eNB represents the 4G base station, MeNB represents the primary 4G base station, SgNB represents the secondary node, S1, X2, S1-U, X2-C, LTE Uu represents interfaces respectively.

As shown in FIG. 3, the IAB-node is connected to the IAB-donor through one or more hops to form a directed acyclic graph (DAG). Among them, the IAB-node is divided into two parts, namely the terminal part (i.e. IAB-MT) and the part supporting the function of 5G base station distribution unit (gNB-DU) (i.e. IAB-DU), which is connected to its parent node through IAB-MT, is connected to its child nodes through IAB-DU.

However, if some IAB nodes frequently experience RLF, they may not be suitable for the routing line they are currently on, thus making the communication effect poor.

SUMMARY

The present application aims to provide a signal obtaining method, a processing method, a node, a network device and an apparatus, so as to collect the parameter information for optimizing the topology structure including the first node and the second node.

In a first aspect, an embodiment of the present application provides an information obtaining method, applied to a first node, and includes: in a case that a radio link failure (RLF) is detected for a second node, receiving an indication related to the RLF of the second node sent by the second node, wherein the second node is a parent node of the firs node;

obtaining first parameter information for optimizing a topology structure according to the indication, wherein the topology structure includes the first node and the second node.

Optionally, an embodiment of the present application provides an information obtaining method, applied to a first node, and includes: in a case that a radio link failure (RLF) is detected for a second node, receiving an indication related to the RLF of the second node sent by the second node, wherein the second node is a parent node of the first node; obtaining first parameter information of the indication.

Optionally, the indication includes at least one of the following indications: a first indication, wherein the first indication is used to indicate that the RLF is detected for the second node; a second indication, wherein the second indication is used to indicate that the RLF is detected for the second node and the second node is trying to recover a radio link; a third indication, wherein the third indication is used to indicate that second node succeeds recovery of the radio link; a fourth indication, wherein the fourth indication is used to instruct the first node to perform the RLF; or a fifth indication, where the fifth indication is used to indicate that the second node fails recovery of the radio link.

Optionally, the first parameter information includes at least one of the following: each indication that is received and a number of times the indication was received; a duration of a first type of timer, wherein a timing parameter of the first type of timer used to determine the duration is determined according to a first target moment, and the first target moment includes receiving moments of various indications, a moment that the first node is connected to the second node, a moment that the first node sends the first parameter information to a network device, and a moment that a sending condition of the first node sending the first parameter information to the network device is triggered, and a moment that the RLF is detected for the first node; a measurement result of a primary cell at a first preset moment; a measurement results of a neighboring cell at the first preset moment; a radio network temporary identifier (C-RNTI) of the first node; a cell identifier of the second node; a primary cell identifier when the RLF occurs; a cell identifier of reestablishment of the first node; or a cell identifier of reconnection of the first node.

Optionally, the first preset moment includes at least one of the following: a moment that the RLF is detected for the first node; a moment that the sending condition of the first node sending the first parameter information to the network device is triggered; or a moment that the first node sends the first parameter information to the network device.

Optionally, the first parameter information includes at least one of the following: each indication that is received; a number of times the indication was received; a duration of a first type of timer, wherein a timing parameter of the first type of timer used to determine the duration is determined according to a first target moment, and the first target moment includes receiving moments of various indications, a moment that the first node is connected to the second node, a moment that the first node sends the first parameter information to a network device, and a moment that a sending condition of the first node sending the first parameter information to the network device is triggered, and a moment that the RLF is detected for the first node; a measurement result of a primary cell at a first preset moment; a measurement results of a neighboring cell at the first preset moment; a radio network temporary identifier (C-RNTI) of the first node; a cell identifier of the second node; a primary cell identifier when the RLF occurs; a cell identifier of reestablishment of the first node; or a cell identifier of reconnection of the first node.

Optionally, the timing parameter of the first type of timer determined according to the first target moment include at least one of the following: if a starting timing moment in the timing parameter of the first type of timer is the moment that the first node is connected to the second node, or is the moment that the first node receives a first indication, then an end timing moment in the timing parameter of the first type of timer is the moment that the first node sends the first parameter information to the network device, or the moment that the sending condition of the first node sending the first parameter information to the network device is triggered, or the moment that the RLF is detected for the first node; if the starting timing moment in the timing parameter of the first type of timer is a receiving moment of a last first indication or second indication before receiving a third indication, the end timing moment in the timing parameter of the first type of timer is a moment that the third indication is received; if the starting timing moment in the timing parameter of the first type of timer is a receiving moment of the last first indication or second indication before receiving a fifth indication, the end timing moment in the timing parameter of the firs type of timer is a moment that the fifth indication is received; if the starting timing moment in the timing parameter of the first type of timer is the moment that the RLF is detected for the first node or a moment that a fourth indication is received, the end timing moment in the timing parameter of the first type of timer is the moment that the first node sends the first parameter information to the network device, or the moment that the sending condition of the first node sending the first parameter information to the network device is triggered; or if the starting timing moment in the timing parameter of the first type of timer is the receiving moment of the last first indication or second indication before receiving the fourth indication, the end timing moment in the timing parameter of the first type of timer is the moment that the fourth indication is received.

Optionally, the information obtaining method further includes: sending the first parameter information to the network device, so that the network device optimizes the topology structure according the first parameter information.

Optionally, the information obtaining method further includes: sending the first parameter information to the network device.

Optionally, the information obtaining method further includes: if the indication includes a preset indication, and the RLF is detected for the first node, sending a failure cause indication to the network device; wherein, the failure cause indication is used to indicate that an RLF reason of the first node is the received preset indication, or that the RLF is detected for the second node; the preset indication includes at least one of the first indication, the second indication, the fourth indication, or the fifth indication.

Optionally, the sending the first parameter information to the network device includes: sending obtained first parameter information to the network device every first preset time interval; or when receiving request information sent by the network device, sending the obtained first parameter information to the network device; or when a preset first timer expires, sending the obtained the first parameter information to the network device; or for received indications, if a number of sending times of N types of indications respectively reaches threshold values of the N types of indications, sending the obtained first parameter information to the network device, wherein M is a number of types of the indications, N is an integer from 1 to M.

In a second aspect, an embodiment of the present application provides an information obtaining method, applied to a second node, and comprising: in a case that a radio link failure (RLF) is detected for the second node, sending an indication related to the RLF of the second node to at least one first node, wherein the second node is a parent node of the first node; obtaining second parameter information of the indication.

Optionally, the indication includes at least one of the following indications: a first indication, wherein the first indication is used to indicate that the RLF is detected for the second node; a second indication, wherein the second indication is used to indicate that the RLF is detected for second node and the second node is trying to recover a radio link; a third indication, wherein the third indication is used to indicate that second node succeeds recovery of the radio link; a fourth indication, wherein the fourth indication is used to instruct the first node to perform the RLF; or a fifth indication, where the fifth indication is used to indicate that the second node fails recovery of the radio link.

Optionally, the second parameter information includes at least one of the following: each indication that is sent and a number of times the indication was sent; a cell identifier of a node receiving the indication; a cell identifier of a node associated with each indication, wherein the associated node is a node other than the second node among nodes to which the RLF indicated by the indication belongs; a duration of a second type of timer, wherein a timing parameter of the second type of timer used to determine the duration is determined according to a second target moment, and the second target moment includes sending moments of various indications, a moment that the second node is connected to a third node, a moment that the second node sends the second parameter information to a network device, and a moment that a sending condition of the second node sending the second parameter information to the network device is triggered, a moment that the RLF is detected for the second node, and the third node is a parent node of the second node where the RLF occurs; a measurement result of a primary cell at a second preset moment; a measurement result of a neighboring cell at the second preset moment; a radio network temporary identifier (C-RNTI) of the second node; a cell identifier of the primary cell when the RLF is detected for the second node; a cell identifier of reestablishment of the second node; or a cell identifier of reconnection of the second node.

Optionally, the second parameter information includes at least one of the following: each indication that is sent; a number of times the indication was sent; a cell identifier of a node receiving the indication; a cell identifier of a node associated with each indication, wherein the associated node is a node other than the second node among nodes to which the RLF indicated by the indication belongs; a duration of a second type of timer, wherein a timing parameter of the second type of timer used to determine the duration is determined according to a second target moment, and the second target moment includes sending moments of various indications, a moment that the second node is connected to a third node, a moment that the second node sends the second parameter information to a network device, and a moment that a sending condition of the second node sending the second parameter information to the network device is triggered, a moment that the RLF is detected for the second node, and the third node is a parent node of the second node where the RLF occurs; a measurement result of a primary cell at a second preset moment; a measurement result of a neighboring cell at the second preset moment; a radio network temporary identifier (C-RNTI) of the second node; a cell identifier of the primary cell when the RLF is detected for the second node; a cell identifier of reestablishment of the second node; or a cell identifier of reconnection of the second node.

Optionally, the second preset moment includes at least one of the following: a moment that the RLF is detected for the second node; a moment that the sending condition of the second node sending the second parameter information to the network device is triggered; or a moment that the second node sends the second parameter information to the network device.

Optionally, the timing parameter of the second type of timer determined according to the second target moment include at least one of the following: if a starting timing moment in the timing parameter of the second type of timer is a moment that the second node is connected to a third node, or is the moment that the second node sends the first indication, then an end timing moment in the timing parameter of the second type of timer is the moment that the second node sends the second parameter information to the network device, or the moment that the sending condition that the second node sends the second parameter information to the network device is triggered, or the moment that the RLF is detected for the second node; if the starting timing moment in the timing parameter of the second type of timer is a sending time of a last first indication or second indication before sending the third indication, then the end timing moment in the timing parameter of the second type of timer is the moment that the third indication is sent; if the starting timing moment in the timing parameter of the second type of timer is the sending time of the last first indication or second indication before sending the fifth indication, the end timing moment in the timing parameter of the second type of timer is the moment that the fifth indication is sent; if the starting timing moment in the timing parameter of the second type of timer is the moment that the RLF is detected for the second node, then the end timing moment in the timing parameter of the second type of timer is the moment that the second node sends the second parameter information to the network device, or the moment that the sending condition of the second node sending the second parameter information to the network device is triggered; or if the starting timing moment in the timing parameter of the second type of timer is the sending time of the last first indication or second indication before sending the fourth indication, the end timing moment in the timing parameter of the second type of timer the moment that the fourth indication is sent.

Optionally, the information obtaining method further includes: sending the second parameter information to the network device, so that the network device optimizes the topology structure according the second parameter information.

Optionally, the information obtaining method further includes: sending the second parameter information to the network device.

Optionally, the information obtaining method further includes: sending third parameter information to the network device; wherein, the third parameter information includes at least one of the following: a sending result indication recorded when the RLF is detected for the second node, wherein the sending result indication is used to indicate whether the indication is sent to a child node of the second node; various indications sent to the child node of the second node and recorded when the RLF is detected for the second node; or a cell identifier of a node that receives the indication, which is recorded when the RLF is detected for the second node.

Optionally, the sending the second parameter information to the network device comprises: sending obtained second parameter information to the network device at every second preset time interval; or when request information sent by the network device has been received, sending the obtained second parameter information to the network device; or when a preset second timer expires, sending the obtained second parameter information to the network device; or for received indications, if a number of sending times of K types of indications respectively reaches threshold values of the K types of indications, sending the obtained second parameter information to the network device, wherein M is a number of types of the indications, K is an integer from 1 to M.

In a third aspect, an embodiment of the present application provides an information processing method, applied to a network device and includes: receiving parameter information for optimizing a topology structure, wherein, the parameter information is sent by a first node and/or the second node included in the topology structure, the second node is a parent node of the first node; optimizing the topology structure according to the parameter information.

Optionally, an embodiment of the present application provides an information processing method, applied to a network device and includes: receiving parameter information of an indication related to a radio link failure (RLF) of a second node, wherein, the parameter information is sent by a first node and/or the second node, the second node is a parent node of the first node; optimizing a topology structure according to the parameter information.

In a fourth aspect, an embodiment of the present application provides a node, wherein the node is used as a first node and the node includes a memory, a transceiver, and a processor, the memory is used to store computer programs; the transceiver is used to send and receive data under the control of the processor; the processor is used to read the computer programs in the memory and perform the following operations: in a case that a radio link failure (RLF) is detected for a second node, controlling the transceiver to receive an indication related to the RLF of the second node sent by the second node, wherein the second node is a parent node of the first node; obtaining first parameter information of the indication.

Optionally, the indication includes at least one of the following indications: a first indication, wherein the first indication is used to indicate that the RLF is detected for the second node; a second indication, wherein the second indication is used to indicate that the RLF is detected for the second node and the second node is trying to recover a radio link; a third indication, wherein the third indication is used to indicate that second node succeeds recovery of the radio link; a fourth indication, wherein the fourth indication is used to instruct the first node to perform the RLF; or a fifth indication, where the fifth indication is used to indicate that the second node fails recovery of the radio link.

Optionally, the first parameter information includes at least one of the following: each indication that is received; a number of times the indication was received; a duration of a first type of timer, wherein a timing parameter of the first type of timer used to determine the duration is determined according to a first target moment, and the first target moment includes receiving moments of various indications, a moment that the first node is connected to the second node, a moment that the first node sends the first parameter information to a network device, and a moment that a sending condition of the first node sending the first parameter information to the network device is triggered, and a moment that the RLF is detected for the first node; a measurement result of a primary cell at a first preset moment; a measurement results of a neighboring cell at the first preset moment; a radio network temporary identifier (C-RNTI) of the first node; a cell identifier of the second node; a primary cell identifier when the RLF occurs; a cell identifier of reestablishment of the first node; or a cell identifier of reconnection of the first node.

Optionally, the first preset moment includes at least one of the following: a moment that the RLF is detected for the first node; a moment that the sending condition of the first node sending the first parameter information to the network device is triggered; or a moment that the first node sends the first parameter information to the network device.

Optionally, the first parameter information includes at least one of the following: each indication that is received and a number of times the indication was received; a duration of a first type of timer, wherein a timing parameter of the first type of timer used to determine the duration is determined according to a first target moment, and the first target moment includes receiving moments of various indications, a moment that the first node is connected to the second node, a moment that the first node sends the first parameter information to a network device, and a moment that a sending condition of the first node sending the first parameter information to the network device is triggered, and a moment that the RLF is detected for the first node; a measurement result of a primary cell at a first preset moment; a measurement results of a neighboring cell at the first preset moment; a radio network temporary identifier (C-RNTI) of the first node; a cell identifier of the second node; a primary cell identifier when the RLF occurs; a cell identifier of reestablishment of the first node; or a cell identifier of reconnection of the first node.

Optionally, the timing parameter of the first type of timer determined according to the first target moment include at least one of the following: if a starting timing moment in the timing parameter of the first type of timer is the moment that the first node is connected to the second node, or is the moment that the first node receives a first indication, then an end timing moment in the timing parameter of the first type of timer is the moment that the first node sends the first parameter information to the network device, or the moment that the sending condition of the first node sending the first parameter information to the network device is triggered, or the moment that the RLF is detected for the first node; if the starting timing moment in the timing parameter of the first type of timer is a receiving moment of a last first indication or second indication before receiving a third indication, the end timing moment in the timing parameter of the first type of timer is a moment that the third indication is received; if the starting timing moment in the timing parameter of the first type of timer is a receiving moment of the last first indication or second indication before receiving a fifth indication, the end timing moment in the timing parameter of the firs type of timer is a moment that the fifth indication is received; if the starting timing moment in the timing parameter of the first type of timer is the moment that the RLF is detected for the first node or a moment that a fourth indication is received, the end timing moment in the timing parameter of the first type of timer is the moment that the first node sends the first parameter information to the network device, or the moment that the sending condition of the first node sending the first parameter information to the network device is triggered; or if the starting timing moment in the timing parameter of the first type of timer is the receiving moment of the last first indication or second indication before receiving the fourth indication, the end timing moment in the timing parameter of the first type of timer is the moment that the fourth indication is received.

Optionally, the transceiver is further configured to: send the first parameter information to the network device, so that the network device optimizes the topology structure according the first parameter information.

Optionally, the transceiver is further configured to: send the first parameter information to the network device.

Optionally, the transceiver is further configured to: if the indication includes a preset indication, and the RLF is detected for the first node, send a failure cause indication to the network device; wherein, the failure cause indication is used to indicate that an RLF reason of the first node is the received preset indication, or that the RLF is detected for the second node; the preset indication includes at least one of the first indication, the second indication, the fourth indication, or the fifth indication.

Optionally, the sending the first parameter information to the network device includes: sending obtained first parameter information to the network device every first preset time interval; or when receiving request information sent by the network device, sending the obtained first parameter information to the network device; or when a preset first timer expires, sending the obtained the first parameter information to the network device; or for received indications, if a number of sending times of N types of indications respectively reaches threshold values of the N types of indications, sending the obtained first parameter information to the network device, wherein M is a number of types of the indications, N is an integer from 1 to M.

In a fifth aspect, an embodiment of the present application provides a node, wherein the node is used as a second node; and the node includes a memory, a transceiver, and a processor: the memory is used to store computer programs; the transceiver is used to send and receive data under the control of the processor; the processor is used to read the computer programs in the memory and perform the following operations: in a case that a radio link failure (RLF) is detected for the second node, controlling the transceiver to send an indication related to the RLF of the second node to at least one first node, wherein the second node is a parent node of the first node; obtaining the second parameter information for optimizing the topology structure according to the indication, wherein the topology structure includes the first node and the second node.

Optionally, an embodiment of the present application provides a node, wherein the node is used as a second node; and the node includes a memory, a transceiver, and a processor: the memory is used to store computer programs; the transceiver is used to send and receive data under the control of the processor; the processor is used to read the computer programs in the memory and perform the following operations: in a case that a radio link failure (RLF) is detected for the second node, controlling the transceiver to send an indication related to the RLF of the second node to at least one first node, wherein the second node is a parent node of the first node; obtaining second parameter information of the indication.

Optionally, the indication includes at least one of the following indications: a first indication, wherein the first indication is used to indicate that the RLF is detected for the second node; a second indication, wherein the second indication is used to indicate that the RLF is detected for second node and the second node is trying to recover a radio link;

a third indication, wherein the third indication is used to indicate that second node succeeds recovery of the radio link; a fourth indication, wherein the fourth indication is used to instruct the first node to perform the RLF; or a fifth indication, where the fifth indication is used to indicate that the second node fails recovery of the radio link.

Optionally, the second parameter information includes at least one of the following: each indication that is sent and a number of times the indication was sent; a cell identifier of a node receiving the indication; a cell identifier of a node associated with each indication, wherein the associated node is a node other than the second node among nodes to which the RLF indicated by the indication belongs; a duration of a second type of timer, wherein a timing parameter of the second type of timer used to determine the duration is determined according to a second target moment, and the second target moment includes sending moments of various indications, a moment that the second node is connected to a third node, a moment that the second node sends the second parameter information to a network device, and a moment that a sending condition of the second node sending the second parameter information to the network device is triggered, a moment that the RLF is detected for the second node, and the third node is a parent node of the second node where the RLF occurs; a measurement result of a primary cell at a second preset moment; a measurement result of a neighboring cell at the second preset moment; a radio network temporary identifier (C-RNTI) of the second node; a cell identifier of the primary cell when the RLF is detected for the second node; a cell identifier of reestablishment of the second node; or a cell identifier of reconnection of the second node.

Optionally, the second parameter information includes at least one of the following: each indication that is sent; a number of times the indication was sent; a cell identifier of a node receiving the indication; a cell identifier of a node associated with each indication, wherein the associated node is a node other than the second node among nodes to which the RLF indicated by the indication belongs; a duration of a second type of timer, wherein a timing parameter of the second type of timer used to determine the duration is determined according to a second target moment, and the second target moment includes sending moments of various indications, a moment that the second node is connected to a third node, a moment that the second node sends the second parameter information to a network device, and a moment that a sending condition of the second node sending the second parameter information to the network device is triggered, a moment that the RLF is detected for the second node, and the third node is a parent node of the second node where the RLF occurs; a measurement result of a primary cell at a second preset moment; a measurement result of a neighboring cell at the second preset moment; a radio network temporary identifier (C-RNTI) of the second node; a cell identifier of the primary cell when the RLF is detected for the second node; a cell identifier of reestablishment of the second node; or a cell identifier of reconnection of the second node.

Optionally, the second preset moment includes at least one of the following: a moment that the RLF is detected for the second node; a moment that the sending condition of the second node sending the second parameter information to the network device is triggered; or a moment that the second node sends the second parameter information to the network device.

Optionally, the timing parameter of the second type of timer determined according to the second target moment include at least one of the following: if a starting timing moment in the timing parameter of the second type of timer is a moment that the second node is connected to a third node, or is the moment that the second node sends the first indication, then an end timing moment in the timing parameter of the second type of timer is the moment that the second node sends the second parameter information to the network device, or the moment that the sending condition that the second node sends the second parameter information to the network device is triggered, or the moment that the RLF is detected for the second node; if the starting timing moment in the timing parameter of the second type of timer is a sending time of a last first indication or second indication before sending the third indication, then the end timing moment in the timing parameter of the second type of timer is the moment that the third indication is sent; if the starting timing moment in the timing parameter of the second type of timer is the sending time of the last first indication or second indication before sending the fifth indication, the end timing moment in the timing parameter of the second type of timer is the moment that the fifth indication is sent; if the starting timing moment in the timing parameter of the second type of timer is the moment that the RLF is detected for the second node, then the end timing moment in the timing parameter of the second type of timer is the moment that the second node sends the second parameter information to the network device, or the moment that the sending condition of the second node sending the second parameter information to the network device is triggered; or if the starting timing moment in the timing parameter of the second type of timer is the sending time of the last first indication or second indication before sending the fourth indication, the end timing moment in the timing parameter of the second type of timer the moment that the fourth indication is sent.

Optionally, the transceiver is further configured to: send the second parameter information to the network device, so that the network device optimizes the topology structure according the second parameter information.

Optionally, the transceiver is further configured to: send the second parameter information to the network device.

Optionally, the transceiver is further configured to: send third parameter information to the network device; wherein, the third parameter information includes at least one of the following: a sending result indication recorded when the RLF is detected for the second node, wherein the sending result indication is used to indicate whether the indication is sent to a child node of the second node; various indications sent to the child node of the second node and recorded when the RLF is detected for the second node; or a cell identifier of a node that receives the indication, which is recorded when the RLF is detected for the second node.

Optionally, the sending the second parameter information to the network device comprises: sending obtained second parameter information to the network device at every second preset time interval; or when request information sent by the network device has been received, sending the obtained second parameter information to the network device; or when a preset second timer expires, sending the obtained second parameter information to the network device; or for received indications, if a number of sending times of K types of indications respectively reaches threshold values of the K types of indications, sending the obtained second parameter information to the network device, wherein M is a number of types of the indications, K is an integer from 1 to M.

In a sixth aspect, an embodiment of the present application provides a network device, comprising a memory, a transceiver, and a processor, wherein the memory is used to store computer programs; the transceiver is used to send and receive data under the control of the processor; the processor is used to read the computer programs in the memory and perform the following operations: controlling the transceiver to receive parameter information for optimizing the topology structure, wherein, the parameter information is sent by a first node and/or the second node included in the topology structure, the second node is a parent node of the first node; optimizing a topology structure according to the parameter information.

Optionally, an embodiment of the present application provides a network device, comprising a memory, a transceiver, and a processor, wherein the memory is used to store computer programs; the transceiver is used to send and receive data under the control of the processor; the processor is used to read the computer programs in the memory and perform the following operations: controlling the transceiver to receive parameter information of an indication related to a radio link failure (RLF) of a second node, wherein, the parameter information is sent by a first node and/or the second node, the second node is a parent node of the first node; optimizing a topology structure according to the parameter information.

In a seventh aspect, an embodiment of the present application provides an information obtaining device, applied to the first node, and comprising: an indication sending module, configured to, in a case that a radio link failure (RLF) is detected for a second node, receive an indication related to the RLF of the second node sent by the second node, wherein the second node is a parent node of the first node; a first parameter information obtaining module, configured to obtain first parameter information for optimizing a topology structure according to the indication, wherein the topology structure includes the first node and the second node.

Optionally, an embodiment of the present application provides an information obtaining device, applied to the first node, and comprising: an indication sending module, configured to, in a case that a radio link failure (RLF) is detected for a second node, receive an indication related to the RLF of the second node sent by the second node, wherein the second node is a parent node of the first node; a first parameter information obtaining module, configured to obtain first parameter information of the indication.

In an eighth aspect, an embodiment of the present application provides an information obtaining device, applied to a second node, and comprising: an indication receiving module, configured to in a case that a radio link failure (RLF) is detected for the second node, send an indication related to the RLF of the second node to at least one first node, wherein the second node is a parent node of the first node; a second parameter information obtain module, configured to obtain second parameter information for optimizing a topology structure according to the indication, wherein the topology structure includes the first node and the second node.

Optionally, an embodiment of the present application provides an information obtaining device, applied to a second node, and comprising: an indication receiving module, configured to in a case that a radio link failure (RLF) is detected for the second node, send an indication related to the RLF of the second node to at least one first node, wherein the second node is a parent node of the first node; a second parameter information obtain module, configured to obtain second parameter information of the indication.

In a ninth aspect, an embodiment of the present application provides an information processing device, applied to a network device and comprising: a parameter receiving module, configured to receive parameter information for optimizing a topology structure, wherein, the parameter information is sent by a first node and/or the second node included in the topology structure, the second node is a parent node of the first node; an optimization module, configured to optimize a topology according to the parameter information.

Optionally, an embodiment of the present application provides an information processing device, applied to a network device and comprising: a parameter receiving module, configured to receive parameter information of an indication related to a radio link failure (RLF) of a second node, wherein, the parameter information is sent by a first node and/or the second node, the second node is a parent node of the first node; an optimization module, configured to optimize a topology according to the parameter information.

In a tenth aspect, an embodiment of the present application provides a processor-readable storage medium, wherein a computer program is stored in the processor-readable storage medium, and the computer program is used to enable a processor to execute the information obtaining method, or perform the information processing method in the second aspect or the third aspect.

In an eleventh aspect, an embodiment of the present application provides a computer program comprising computer readable codes, wherein a computing processing device executes the computer readable codes to perform the information obtaining method, or perform the information processing method in the second aspect of the third aspect.

In a twelfth aspect, an embodiment of the present application provides a computer readable medium, on which the computer program in the eleventh aspect is stored.

it can be seen that in the embodiment of the present application, when RLF is detected for the second node, the first node will receive an indication related to the RLF of the second node sent by the second node, thereby triggering the first node to obtain the first parameter information for optimizing the topology structure including the first node and the second node according to the indication, where the second node is the parent node of the first node. It can be seen that, in the embodiments of the present application, when RLF occurs in the parent node of one node, the node will receive an indication related to RLF occurred at the parent node sent by the parent node, thereby triggering the node to obtain the first parameter information for optimizing the topology structure according to the indication, therefore, the embodiments of the present application implement a mechanism for collecting information on the optimized topology structure, thereby providing a basis for the optimization of the topology structure, and further laying the data foundation for improving the communication quality of the topology structure.

The above description is only an overview of the technical solution of the present application, in order to be able to better understand the technical means of the present application, and be implemented in accordance with the content of the description, and to make the above and other purposes, features and advantages of the present application more obvious and easy to understand, the specific embodiments of the present application are hereby mentioned.

BRIEF DESCRIPTION OF THE DRAWINGS

In order to more clearly illustrate the technical solutions of the embodiments of the present application, the following will briefly introduce the accompanying drawings that need to be used in the description of the embodiments of the present application. Obviously, the accompanying drawings in the following description are only some embodiments of the present application, for those ordinary skilled in the art, other drawings can also be obtained according to these drawings without creative work.

DETAILED DESCRIPTION

Figure 1:
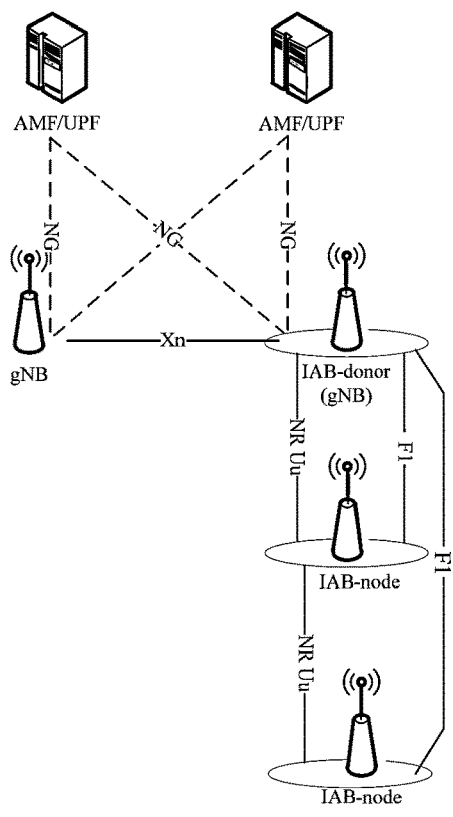
FIG. 1 is a first schematic diagram of the IAB network architecture in the related art.
Figure 2:
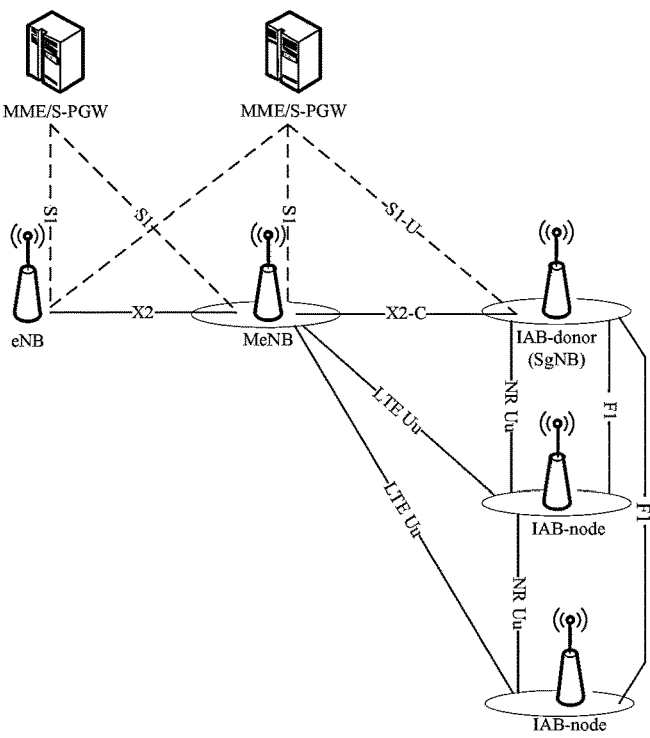
FIG. 2 is the second schematic diagram of the IAB network structure diagram in the related art.
Figure 3:
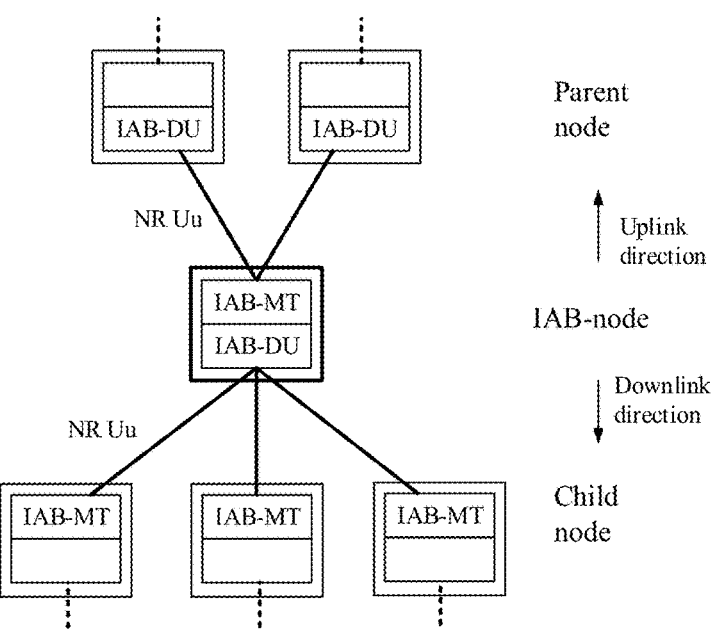
FIG. 3 is the connection diagram of child node and parent node of IAB node in the related art.

In order to make the technical problems, technical solutions and advantages to be solved by the present application clearer, the following will describe in detail with reference to the drawings and specific embodiments.

The term "and/or" in the embodiments of the present application describes the association relationship of associated objects, indicating that there may be three relationships, for example, A and/or B, which may mean: A exists alone, A and B exist simultaneously, and B exists alone. The character "/" generally indicates that the contextual objects are an "or" relationship.

The term "plurality" in the embodiments of the present application refers to two or more, and other quantifiers are similar.

The following will clearly and completely describe the technical solutions in the embodiments of the present application with reference to the accompanying drawings. Obviously, the described embodiments are only some of the embodiments of the present application, not all of them. Based on the embodiments in the present application, all other embodiments obtained by the person ordinary skilled in the art without creative work belong to the scope of protection of the present application.

Embodiments of the present application provide an information obtaining method and device, so as to collect parameter information for optimizing a topology structure including a first node and a second node.

Among them, the method and the device are based on the same concept. Since the principle of solving problems of the method and the device is similar, the implementation of the device and the method can be referred to each other, and the repetition will not be repeated.

In addition, the technical solutions provided by the embodiments of the present application may be applicable to various systems, especially 5G systems. For example, the applicable system may be global system of mobile communication (GSM) system, code division multiple access (CDMA) system, wideband code division multiple access (WCDMA) general packet Wireless service (GPRS) system, long term evolution (LTE) system, LTE frequency division duplex (FDD) system, LTE time division duplex (TDD) system, Long term evolution advanced (LTE-A) system, universal mobile telecommunications system (UMTS), worldwide interoperability for microwave access (WiMAX) system, 5G new air interface (New Radio, NR) system, etc. These various systems include end devices and network devices. The system may also include a core network part, such as an evolved packet system (EPS), a 5G system (5GS), and the like.

The terminal device involved in the embodiments of the present application may be a device that provides voice and/or data connectivity to users, a handheld device with a wireless connection function, or other processing devices connected to a wireless modem. In different systems, the name of the terminal equipment may be different. For example, in a 5G system, the terminal equipment may be called user equipment (UE). Wireless terminal equipment can communicate with one or more core networks (CN) via a radio access network (RAN). The wireless terminal equipment can be a mobile terminal equipment, such as a mobile phone (or called a "cellular" telephones) and computers with mobile terminal equipment, such as portable, pocket, hand-held, computer built-in or vehicle-mounted mobile devices, which exchange voice and/or data with the radio access network. For example, Personal Communication Service (PCS) phones, cordless phones, Session Initiated Protocol (SIP) phones, Wireless Local Loop (WLL) stations, Personal Digital Assistant (PDA) and other devices. Wireless terminal equipment can also be called system, subscriber unit, sub-scriber station, mobile station, remote station, access point, a remote terminal, an access terminal, a user terminal, a user agent, and a user device, which are not limited in the embodiments of the present application.

The network device involved in the embodiments of the present application may be a base station, and the base station may include multiple cells that provide services for terminals. Depending on the specific application, the base station can also be called an access point, or it can be a device in the access network that communicates with the wireless terminal device through one or more sectors on the air interface, or other names. Network devices can be used to interchange received over-the-air frames with Internet Protocol (IP) packets and act as routers between wireless end devices and the rest of the access network, which can include the Internet Protocol (IP) communication network. Network devices may also coordinate attribute management for the air interface. For example, the network device involved in this embodiment of the present application may be a network device (Base Transceiver Station, BTS) in Global System for Mobile communications (GSM) or Code Division Multiple Access (CDMA).), or a network device (NodeB) in Wide-band Code Division Multiple Access (WCDMA), or an evolved network device in a long term evolution (LTE) system (evolutional Node B, eNB or e-NodeB), 5G base station (gNB) in the 5G network architecture (next generation system), can also be a home evolved base station (Home evolved Node B, HeNB), relay node, a home base station (femto), a pico base station (pico), etc., are not limited in this embodiment of the present application. In some network structures, a network device may include a centralized unit (CU) node and a distributed unit (DU) node, and the centralized unit and the distributed unit may also be arranged geographically separately.

One or more antennas can be used between network devices and terminal devices for Multi Input Multi Output (MIMO) transmission, and MIMO transmission can be Single User MIMO (SU-MIMO) or Multi-User MIMO (MU-MIMO). According to the shape and number of root antenna combinations, MIMO transmission can be 2D-MIMO, 3D-MIMO, FD-MIMO, or massive-MIMO, or diversity transmission, precoding transmission, or beam-forming transmission, etc.

In order to facilitate the understanding of the information obtaining method provided by the embodiments of the present application, the RLF is firstly introduced as follows.

In the NR system, the reasons for RLF are as follows:

The first type: T310 timer timeout;

The second type: T312 timer timeout;

The third type: under certain conditions, Media Access Control (MAC) reports random access problems (including beam failure recovery failure and random access problems);

The fourth type: under certain conditions, the RLC reports that the maximum number of retransmissions is reached for the Signaling Radio Bearer (SRB) or the Data Radio Bearer (DRB);

The fifth type: under certain conditions, listen first and then talk continuously, (Listen Before Talk, LBT) fails;

The sixth type: For 5G integrated access backhaul mobile terminal (IAB-MT), it receives the backhaul radio link failure (BH RLF) indication from its parent node, etc.

Among them, for the timeout of T310, if the radio resource control (RRC) of the UE continuously receives N (such as the value of N310) "out-of-sync" indications from the bottom layer, the RLF timer T310 is started.

Among them, if the RRC layer continuously receives M (for example, the value of N311) "in-sync" indications during the operation of T310, it is considered that the out-of-sync problem has been solved, and the T310 timer is stopped; If M (for example, the value of N311) "in-syncs" indication cannot be received during the operation of T310, which will eventually cause the T310 timer to expire, it is considered that the wireless link cannot be maintained, and a wireless link failure has occurred. Subsequently, the UE may select a new cell to initiate a reestablishment process, or enter an idle state according to specific conditions.

For T312 timeout, it is an enhancement for wireless link failure in heterogeneous networks. If T310 has been started, and at this time, the UE evaluates and organizes a measurement report (that is, a measurement report for the target cell), then the UE starts the timer T312 while sending the measurement report. The total length of T312 is the maximum allowable time set by the network for the UE from sending the measurement report to receiving the handover command. If T312 expires, the UE may directly generate RLF without waiting for T310 to expire. And if T310 is terminated because the condition is triggered, T312 will also be stopped accordingly.

However, the MT of the IAB node has the same function as the UE, therefore, RLF may occur between the IAB nodes.

Figure 4:
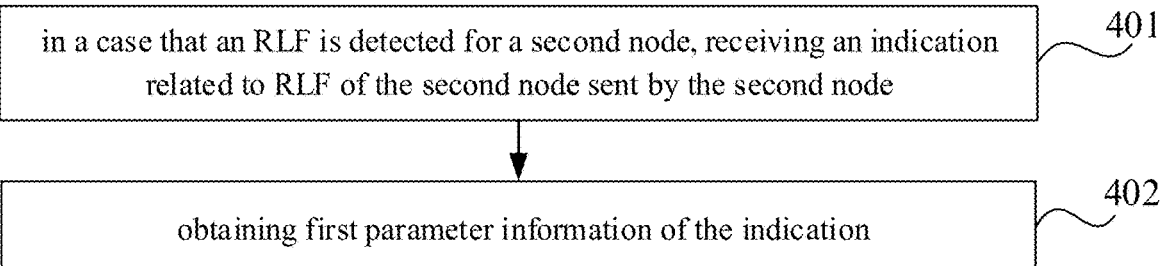
FIG. 4 is a flowchart of an information obtaining method applied to a first node provided by an embodiment of the present application.

FIG. 4 shows a schematic flowchart of an information obtaining method provided by an embodiment of the present application. The method is applied to the first node. As shown in FIG. 4, the method may include the following steps:

Step 401: In a case that a radio link failure (RLF) is detected for a second node, receiving an indication related to RLF of the second node sent by the second node.

Wherein, the second node is a parent node of a first node. Optionally, both the first node and the second node are IAB nodes.

In addition, the RFL of the second node refers to the RLF between the second node and the parent node of the second node. And the second node may be connected to one or more parent nodes, therefore, the situation where RLF is detected for the second node may include that RLF occurs between the second node and a parent node of one second node, or between the second node and a parent node of multiple second nodes.

In addition, the second node may be one or more parent nodes of the first node, and the first node may be one or more child nodes of the second node.

Step 402: Obtaining first parameter information of the indication.

That is, in the embodiment of the present application, according to the indication, the first parameter information for optimizing the topology structure is obtained.

Wherein, the topology structure includes the first node and the second node.

From the above steps 401 to 402, it can be seen that in the embodiment of the present application, when RLF is detected for the second node, the first node will receive an indication related to the RLF of the second node sent by the second node, thereby triggering the first node to obtain the first parameter information for optimizing the topology structure including the first node and the second node according to the indication, where the second node is the parent node of the first node. It can be seen that, in the embodiments of the present application, when RLF occurs in the parent node of one node, the node will receive an indication related to RLF occurred at the parent node sent by the parent node, thereby triggering the node to obtain the first parameter information for optimizing the topology structure according to the indication, therefore, the embodiments of the present application implement a mechanism for collecting information on the optimized topology structure, thereby providing a basis for the optimization of the topology structure, and further laying the data foundation for improving the communication quality of the topology structure.

Optionally, the indication includes at least one of the following indications:

a first indication, wherein the first indication is used to indicate that RLF is detected for the second node;

A second indication, wherein the second indication is used to indicate that the RLF is detected for second node and the second node is trying to recover a radio link;

A third indication, wherein the third indication is used to indicate that the second node succeeds recovery of the radio link;

a fourth indication, wherein the fourth indication is used to instruct the first node to perform RLF;

A fifth indication, where the fifth indication is used to indicate that the second node fails recovery of the radio link.

Wherein, instructing the first node to perform the RLF means instructing the first node to start executing according to the processing flow of the RLF occurring between the first node and the second node.

It can be seen that, in the embodiments of the present application, when RLF is detected for the second node, the second node may send at least one of a first indication, a second indication, a third indication, a fourth indication, or a fifth indication to one or more sub-nodes of the second node.

Optionally, the first parameter information includes at least one of the first to ninth items:

A first item: each indication that is received, and a number of times the indication was received;

a second item: a duration of a first type of timer, wherein a timing parameter of the first type of timer used to determine the duration are determined according to a first target moment, and the first target moment includes receiving moments of various indications, a moment that the first node is connected to the second node, a moment that the first node sends the first parameter information to the network device, and a moment that a sending condition of the first node sending the first parameter information to the network device is triggered, and a moment that RLF is detected for the first node.

A third item: a measurement result of a primary cell at a first preset moment;

A fourth item: a measurement results of a neighboring cell at the first preset moment;

A fifth item: a radio network temporary identifier C-RNTI of the first node;

A sixth item: a cell identifier of the second node;

A seventh item: a primary cell identifier when RLF occurs;

An eighth item: a cell identifier of the reestablishment of the first node;

A ninth item: a cell identifier of the reconnection of the first node.

Then, after receiving the indication sent by the second node, the obtaining the first parameter information according to the received indication, includes:

performing statistics on each received indication to obtain first statistical information, Obtaining first attribute information related to the first node and the second node.

Wherein, the first statistical information includes the first item of information and the second item of information in the first parameter information, and the first attribute information includes at least one of the third to ninth items of information in the first parameter information.

Optionally, the first parameter information includes at least one of the following:

each indication that is received, a number of times the indication was received;

a duration of a first type of timer, wherein a timing parameter of the first type of timer used to determine the duration are determined according to a first target moment, and the first target moment includes receiving moments of various indications, a moment that the first node is connected to the second node, a moment that the first node sends the first parameter information to the network device, and a moment that a sending condition of the first node sending the first parameter information to the network device is triggered, and a moment that RLF is detected for the first node.

a measurement result of a primary cell at a first preset moment;

a measurement results of a neighboring cell at the first preset moment;

a radio network temporary identifier C-RNTI of the first node;

a cell identifier of the second node;

a primary cell identifier when RLF occurs;

a cell identifier of the reestablishment of the first node;

a cell identifier of the reconnection of the first node.

Wherein, the first preset moment includes at least one of the following:

a moment that RLF is detected for the first node;

a moment that the sending condition for the first node to send the first parameter information to the network device is triggered;

a moment that the first node sends the first parameter information to the network device.

That is, the measurement results of the primary cell and the measurement results of the neighboring cells when RLF is detected for the first node can be recorded, and the measurement results of the primary cell and the neighboring cells can also be recorded when the sending condition for the first node to send the first parameter information to the network device is triggered. The measurement result of the primary cell and the measurement result of the neighboring cell when the first node sends the first parameter information to the IAB donor.

Wherein, the sending condition for the first node to send the first parameter information to the network device may be one of the following:

a preset period arrives, the first node receives the request information from the network device, the preset first timer times out, a number of receiving times of one type of indication reaches a threshold value, a number of receiving times of two types of indications reaches a threshold value, a number of receiving times of three types of indications reaches a threshold value, a number of receiving times of four types of indications reaches a threshold value, a number of receiving times of five types of indications reaches a threshold value.

In addition, the "primary cell identifier when RLF occurs" mentioned above is the cell identifier of the second node. The "RLF occurs" mentioned here refers to the RLF is detected for the first node, that is, the "the primary cell identifier when RLF occurs" is "the primary cell identifier when RLF is detected for the first node".

In addition, regardless of whether RLF is detected for the first node, the first node can record the first to sixth items of information included in the first parameter information, and only when RLF is detected for the first node, the first node will perform RRC reestablishment and RRC reconnection, therefore, when RLF is detected for the first node, the first node will record the seventh to ninth items of information included in the first parameter information.

In addition, the cell identifier may be a public land mobile network identifier (PLMN ID), a cell identifier (cell ID) and a tracking area code where the cell is located; or the identifier information of the cell may be: Physical cell ID (phyCellID) and carrier frequency (carrierFreq). Wherein, the combination of PLMN ID, cell ID and Tracking Area Code can uniquely identify a cell; the combination of phyCellID and carrierFreq can uniquely identify a cell.

It can be seen from the above that, in the embodiments of the present application, after the first node receives at least one related indication that the RFL is detected for the second node, the first node can count the received indications, that is, perform statistics on the received each type of indication, the number of receiving times of each indication, and the duration of the first type of timer, and collect the measurement results of the primary cell and neighboring cells at the first preset time, the C-RNTI of the first node, the cell identifier of the second node. And in the case that RLF also is detected for the first node, the first node may further collect at least one of the primary cell ID, the cell ID of reestablishment of the first node and the cell ID of reconnection of the first node when RLF is detected for the first node.

Optionally, the timing parameters of the first type of timer determined according to the first target moment include at least one of the following:

If a starting timing moment in the timing parameters of the first type of timer is the moment that the first node is connected to the second node, or is the moment that the first node receives the first indication, then an end timing moment in the timing parameters of the first type of timer is the moment that the first node sends the first parameter information to the network device, or the moment that the sending condition of the first node sending the first parameter information to the network device is triggered, or the moment that RLF is detected for the first node;

If the starting timing moment in the timing parameters of the first type of timer is the receiving moment of the last first indication or the second indication before receiving the third indication, the end timing moment in the timing parameters of the first type of timer is the moment that the third indication is received;

If the starting timing moment in the timing parameters of the first type of timer is the receiving moment of the last first indication or the second indication before receiving the fifth indication, the end timing moment in the timing parameters of the firs type of timer is the moment that the fifth indication is received;

If the starting timing moment in the timing parameters of the first type of timer is the moment that RLF is detected for the first node or the moment that the fourth indication is received, the end timing moment in the timing parameters of the first type of timer is the moment that the first node sends the first parameter information to the network, or the moment that the sending condition of the first node sending the first parameter information to the network device is triggered;

If the starting timing moment in the timing parameters of the first type of timer is the receiving moment of the last first indication or the second indication before receiving the fourth indication, the end timing moment in the timing parameters of the first type of timer is the moment that the fourth indication is received.

Wherein, setting rules of the starting timing moment and the end timing moment in the timing parameters are different, and the corresponding timers are also different. For example: according to the setting rules of the starting timing moment and end timing moment in the timing parameters of the first type of timer described above, the first type of timer can be divided into the first to fifth timers, that is, the first type of timer may specifically include at least one of the first to fifth timers as follows:

The first timer, wherein the starting timing moment of the first timer is the moment that the first node is connected to the second node, or the moment that the first node receives the first indication, and the end timing moment of the first timer is the moment that the first node sends the first parameter information to the IAB donor, or the moment that the sending condition of the first node sending the first parameter information to the network device is triggered, or the moment that the RLF is detected for the first node;

The second timer, wherein the starting timing moment of the second timer is the receiving time of the last first indication or second indication before receiving the third indication, and the end timing moment of the second timer is the moment that the third indication is received;

The third timer, wherein the starting timing moment of the third timer is the receiving time of the last first indication or the second indication before receiving the fifth indication, and the end timing moment of the third timer is the moment that the fifth indication is received;

The fourth timer, wherein the starting timing moment of the fourth timer is the moment that the RLF is detected for the first node, or the moment that the fourth indication is received, and the end timing moment of the fourth timer is the moment that the first node sends the first parameter information to the IAB donor, or the moment that the sending condition of the first node sending the first parameter information to the network device is triggered;

The fifth timer, wherein the starting timing moment of the fifth timer is the receiving time of the last first indication or second indication before receiving the fourth indication, and the end timing moment of the fifth timer is the moment that the fourth indication is received.

It should be noted here that, for the second timer, when the first node receives the first indication or the second indication, it will start the second timer. If the first indication or the second indication is subsequently received again (that is to say, the third indication is not received between receiving the first indication or the second indication twice), then each time the first indication or the second indication is received, the second timer is reset to zero, timing is restarted until the third indication is received, the second timer is stop. Therefore, the duration of the second timer is the duration from the receiving moment of the last first indication or the second indication before the first node receives the third indication to the receiving moment of the third indication.

Similarly, for the third timer, when the first node receives the first indication or the second indication, it will start the third timer. If the first indication or the second indication is subsequently received again, then each time the first indication or the second indication is received, the third timer is reset to zero, timing is restarted until the fifth indication is received, the third timer is stop. Therefore, the duration of the third timer is the duration from the receiving moment of the last first indication or the second indication before the first node receives the fifth indication to the receiving moment of the fifth indication.

Similarly, for the fifth timer, when the first node receives the first indication or the second indication, it will start the fifth timer. If the first indication or the second indication is subsequently received again, then each time the first indication or the second indication is received, the fifth timer is reset to zero, timing is restarted until the fourth indication is received, the fifth timer is stop. Therefore, the duration of the fifth timer is the duration from the receiving moment of the last first indication or the second indication before the first node receives the fourth indication to the receiving moment of the fourth indication.

It can be seen that, in the embodiments of the present application, after receiving various indications sent by the second node, the first node can determine the corresponding duration of the timer and store the same according to the starting timing moment and the end timing moment of the first timer to the fifth timer.

Optionally, the method also includes:

Sending the first parameter information to the network device, so that the network device optimizes the topology structure according to the first parameter information.

Optionally, the method also includes:

Sending the first parameter information to the network device.

Wherein, the first node sends the obtained first parameter information to the network device, so that the network device can optimize the topology structure according to the first parameter information.

In addition, the optimizing topology structure includes adjusting routing lines in the topology structure, and/or modifying network parameters of nodes in the topology structure.

For example, after RLF is detected for the second node, the first parameter information obtained by the first node indicates that the number of times that the RLF is detected for the second node on a certain routing line is relatively frequent, then the network device can adjust the second node to other routing lines, or modify the network parameters of the second node and its parent node where the RLF occurs, so as to realize the optimization of the topology structure and improve the communication quality.

In addition, when the first node and the second node are both IAB nodes, the network device may be an IAB donor.

Optionally, the method also includes:

If the indication includes a preset indication, and the RLF is detected for the first node, sending a failure cause indication to the network device;

Wherein, the failure cause indication is used to indicate that the RLF reason of the first node is the received preset indication, or that RLF is detected for the second node;

The preset indication includes at least one of the first indication, the second indication, the fourth indication, or the fifth indication.

Wherein, when the first node receives at least one of the first indication, the second indication, the fourth indication, or the fifth indication sent by the second node, and RLF is detected for the first node, the RLF reason that the RLF is detected for the first node is very likely to be caused by the RLF of the second node. Therefore, in this case, the first node may send the failure cause indication information to the network device.

In addition, the failure cause indication information may also be sent to the network device together with the first parameter information, or may be sent to the network device separately. For example, at least one of the first parameter information and the failure cause indication information may be added to the RLF report, so that the RLF report is sent to the network device.

Optionally, the sending the first parameter information to the network device includes:

Sending the obtained first parameter information to the network device every first preset time interval;

or

When receiving the request information sent by the network device, sending the obtained first parameter information to the network device;

or

When the preset first timer expires, sending the obtained the first parameter information to the network device;

or

For receiving the indication, if the number of sending times of N types of indications respectively reaches the threshold value of the N types of indications, sending the obtained first parameter information to the network device, wherein M is a number of types of the indications, N is an integer from 1 to M.

Wherein, the threshold value of each indication in the N types of indications may be the same or different.

It can be seen from this that when the preset period arrives, or when the first node receives the request information from the network device, or when the preset first timer times out, or when the number of sending times of N types of indications respectively reaches the threshold values of the N types of indications, the first node may send the accumulated obtained first parameter information to the network device.

As can be seen from the above, in the embodiments of the present application, when the RLF is detected for the parent node of an IAB node and the connection failure related indications are notified to its child node, the IAB node can perform statistics on received indications and collect related information, that is, obtain the first parameter information used to optimize the topology structure composed of IAB nodes, so that the first parameter information can be reported to the IAB donor later, and the IAB donor can adjust the routing lines of the topology structure composed of IAB nodes or optimize the network parameters of nodes in the topology structure.

Figure 5:
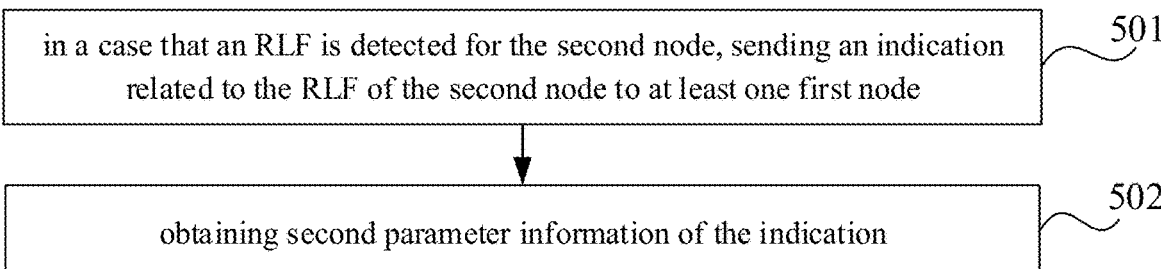
FIG. 5 is a flowchart of an information obtaining method applied to a second node provided by an embodiment of the present application.

FIG. 5 shows a schematic flowchart of an information obtaining method provided by an embodiment of the present application. The method is applied to the second node. As shown in FIG. 5, the method may include the following steps:

Step 501: in a case that a radio link failure (RLF) is detected for the second node, sending an indication related to RLF of the second node to at least one first node.

Wherein, the second node is a parent node of a first node. Optionally, both the first node and the second node are IAB nodes.

In addition, the RFL of the second node refers to the RLF between the second node and the parent node of the second node. And the second node may be connected to one or more parent nodes, therefore, the situation where RLF is detected for the second node may include that RLF occurs between the second node and a parent node of one second node, or between the second node and a parent node of multiple second nodes.

In addition, the second node may be one or more parent nodes of the first node, and the first node may be one or more child nodes of the second node.

Step 502: Obtaining second parameter information of the indication.

That is, in the embodiment of the present application, according to the indication, the first parameter information for optimizing the topology structure is obtained.

Wherein, the topology structure includes the first node and the second node.

From the above steps 501 to 502, it can be seen that in the embodiment of the present application, when RLF is detected for the second node, an indication related to the RLF of the second node is sent to the first node, to obtain the first parameter information for optimizing the topology structure including the first node and the second node according to the indication, where the second node is the parent node of the first node. It can be seen that, in the embodiment of the present application, when RLF is detected for a parent node, in addition to sending an indication related to the RLF of the parent node to the child nodes of the parent node, the second parameter information for optimizing the topology structure is obtained according to the sent indication.

Therefore, the embodiments of the present application not only provide a mechanism for child nodes to collect information for optimizing the topology structure, but also provide a mechanism for parent nodes to collect information for optimizing the topology structure, which provides a basis for topology structure optimization, and further lays the data foundation for improving the communication quality of the topology structure.

Optionally, the indication includes at least one of the following indications:

a first indication, wherein the first indication is used to indicate that RLF is detected for the second node;

A second indication, wherein the second indication is used to indicate that the RLF is detected for second node and the second node is trying to recover a radio link;

A third indication, wherein the third indication is used to indicate that the second node succeeds recovery of the radio link;

a fourth indication, wherein the fourth indication is used to instruct the first node to perform RLF;

A fifth indication, where the fifth indication is used to indicate that the second node fails recovery of the radio link.

Wherein, instructing the first node to perform the RLF means instructing the first node to start executing according to the processing flow of the RLF occurring between the first node and the second node.

It can be seen that, in the embodiments of the present application, when RLF is detected for the second node, the second node may send at least one of a first indication, a second indication, a third indication, a fourth indication, or a fifth indication to one or more sub-nodes of the second node.

Optionally, the second parameter information includes at least one of the following first to tenth items:

a first item: each indication that is sent, a the number of times the indication was sent;

a second item: a cell identifier of a node receiving the indication;

a third item: a cell identifier of a node associated with each indication, wherein the associated node is a node other than the second node among the nodes to which the RLF indicated by the indication belongs;

a fourth item: a duration of the second type of timer, wherein the timing parameters of the second type of timer used to determine the duration are determined according to a second target moment, and the second target moment includes sending moments of various indications, a moment that the second node is connected to the third node, a moment that the second node sends the second parameter information to the network device, and a moment that a sending condition of the second node sending the second parameter information to the network device is triggered, a moment that RLF is detected for the second node, and the third node is the parent node where RLF is detected for the second node;

a fifth item: a measurement result of a primary cell at a second preset moment;

a sixth item: a measurement result of a neighboring cell at the second preset moment;

a seventh item: a radios network temporary identifier (C-RNTI) of the second node;

an eighth item: a cell identifier of the primary cell when RLF is detected for the second node;

a ninth item: a cell identifier of reestablishment of the second node;

a tenth item: a cell identifier of the reconnection of the second node.

It can be seen that the process of obtaining the second parameter information includes:

performing statistics on each sent indication to obtain second statistical information, Obtaining second attribute information related to the first node and the second node.

Wherein, the second statistical information includes the first to fourth items of information, and the second attribute information includes the fifth to ten items of information.

Among them, the first to second items of information that may be included in the above-mentioned second parameter information may be expressed in different methods, such as the following method 1 or method 2:

Method 1: Use the method of "which indication is sent to which nodes several times", for example: the first indication is sent to the first node3 times, and the fourth node 2 times; the second indication is sent to the first node 1 time, and sent to the fourth node 3 times;

Method 2: Use the method of "which node has received which indication several times", for example: the first node receives the first indication 3 times, and the second indication 1 time; the fourth node receives the first indication 2 times, receiving the second indication 3 times.

For the above-mentioned "a cell identifier of a node associated with each indication", for example, the fifth node and the sixth node are both the parent nodes of the second node, but only RLF occurs between the fifth node and the second node, then the node where the RLF belongs refer to the fifth node and the second node. Then the second node will send indications to at least some of its child nodes, and the cell identifier of the node associated with these indications are the cell identifier of the fifth node.

Optionally, the second parameter information includes at least one of the following:

each indication that is sent;

a number of times the indication was sent;

a cell identifier of a node receiving the indication;

a cell identifier of a node associated with each indication, wherein the associated node is a node other than the second node among the nodes to which the RLF indicated by the indication belongs;

a duration of the second type of timer, wherein the timing parameters of the second type of timer used to determine the duration are determined according to a second target moment, and the second target moment includes sending moments of various indications, a moment that the second node is connected to the third node, a moment that the second node sends the second parameter information to the network device, and a moment that a sending condition of the second node sending the second parameter information to the network device is triggered, a moment that RLF is detected for the second node, and the third node is the parent node where RLF is detected for the second node;

a measurement result of a primary cell at a second preset moment;

a measurement result of a neighboring cell at the second preset moment;

a radios network temporary identifier (C-RNTI) of the second node;

a cell identifier of the primary cell when RLF is detected for the second node;

a cell identifier of reestablishment of the second node;

a cell identifier of the reconnection of the second node.

In addition, the second preset moment includes at least one of the following:

a moment that RLF is detected for the second node;

A moment that the sending condition for the second node to send the second parameter information to the network device is triggered;

a moment that the second node sends the second parameter information to the network device.

Wherein, the sending condition for the second node to send the second parameter information to the network device may be one of the following:

a preset period arrives, the second node receives the request information from the network device, the preset second timer times out, a number of receiving times of one type of indication reaches a threshold value, a number of receiving times of two types of indications reaches a threshold value, a number of receiving times of three types of indications reaches a threshold value, a number of receiving times of four types of indications reaches a threshold value, a number of receiving times of five types of indications reaches a threshold value.

In addition, the cell identifier may be the PLMN ID, cell ID and Tracking Area Code where the cell is located; or the cell identifier information may be: phyCellID and carrierFreq. Wherein, the combination of PLMN ID, cell ID and Tracking Area Code can uniquely identify a cell; the combination of phyCellID and carrierFreq can uniquely identify a cell.

It can be seen from the above that, in the embodiments of the present application, after the second node sends at least one related indication that RLF is detected for the second node to the first node, the second node can perform statistics on the sent indications, that is, each sent indication, the number of sending times of each indication, the cell identifier of the node receiving the indication, and the duration of the second type of timer, and collect measurement results of the primary cell and neighboring cells at the second preset time, and the C-RNTI of the second node, the primary cell identifier when RLF is detected for the second node, at least one of the cell identifier of the reestablishment and reconnection of the second node.

Optionally, the timing parameters of the second type of timer determined according to the second target time include at least one of the following:

If the starting timing moment in the timing parameters of the second type of timer is the moment that the second node is connected to the third node, or is the moment that the second node sends the first indication, then the end timing moment in the timing parameters of the second type of timer is the moment that the second node sends the second parameter information to the network device, or the moment that the sending condition that the second node sends the second parameter information to the network device is triggered, or the moment when RLF is detected for the second node;

If the starting timing moment in the timing parameters of the second type of timer is the sending time of the last first indication or the second indication before sending the third indication, then the end timing moment in the timing parameter of the second type of timer is the moment that the third indication is sent;

If the starting timing moment in the timing parameters of the second type of timer is the sending time of the last first indication or the second indication before sending the fifth indication, the end timing moment in the timing parameter of the second type of timer is the moment that the fifth indication is sent;

If the starting timing moment in the timing parameters of the second type of timer is the moment that RLF is detected for the second node, then the end timing moment in the timing parameters of the second type of timer is the moment that the second node sends the second parameter information to the network device, or the moment that the sending condition for the second node to send the second parameter information to the network device is triggered;

If the starting timing moment in the timing parameters of the second type of timer is the sending time of the last first indication or the second indication before sending the fourth indication, the end timing moment in the timing parameters of the second type of timer the moment that the fourth indication is sent.

Among them, according to the rules of the starting timing moment and the end timing moment in the timing parameters of the second type of timer, the second type of timer can be divided into the sixth to tenth timers, that is, the second type of timer specifically may include at least one of the sixth to tenth timers as follows: the sixth timer, wherein the starting timing moment of the sixth timer is the moment that the second node connects to the third node, or the moment that second node sends the first indication, the ending timing moment of the sixth timer is the moment that the second node sends the second parameter information to the network device, or the moment that the sending condition for the second node to send the second parameter information to the network device is triggered, or the moment that RLF is detected for the second node;

The seventh timer, wherein the starting timing moment of the seventh timer is the sending moment of the last first indication or the second indication before sending the third indication, and the ending timing moment of the seventh timer is the moment that the third indication is sent;

The eighth timer, wherein the starting timing moment of the eighth timer is the sending time of the last first indication or the second indication before sending the fifth indication, and the end timing moment of the eighth timer is the moment that the fifth indication is sent;

The ninth timer, wherein the starting timing moment of the ninth timer is the moment that RLF is detected for the second node, and the end timing moment of the ninth timer is the moment that the second node sends the second parameter information to the network device, or that moment that the sending condition for the second node to send the second parameter information to the network device is triggered;

The tenth timer, wherein the starting timing moment of the tenth timer is the sending time of the last first indication or the second indication before the fourth indication is sent, and the end timing moment of the tenth timer is the moment that the fourth indication is sent.

It should be noted here that, for the seventh timer, when the second node sends the first indication or the second indication, it will start the seventh timer, and if the first indication or the second indication is sent again later, then the seventh timer is restarted each time the first indication or the second indication is sent, and the seventh timer is stopped until the third indication is sent. Therefore, the duration of the seventh timer is the duration from the sending moment of the last first indication or the second indication before the second node sends the third indication to the sending moment of the third indication.

Similarly, for the eighth timer, when the second node sends the first indication or the second indication, it will start the eighth timer, and if the first indication or the second indication is sent again subsequently, the eighth timer is restarted each time the first indication or the second indication is sent, and the eighth timer is stopped until the fifth indication is sent. Therefore, the duration of the eighth timer is the duration from the sending moment of the last first indication or the second indication before the second node sends the fifth indication to the sending moment of the fifth indication.

Similarly, for the tenth timer, when the second node sends the first indication or the second indication, it will start the tenth timer, and if the first indication or the second indication is sent again later, the tenth timer is restarted each time the first indication or the second indication is sent, and the tenth timer is stopped until the fourth indication is sent. Therefore, the duration of the tenth timer is the duration from the sending moment of the last first indication or the second indication before the second node sends the fourth indication to the sending moment of fourth indication.

It can be seen that, in the embodiment of the present application, after the second node sends various indications to the first node, it can record the duration of the corresponding timer according to the starting timing moment and end timing moment of the sixth timer to the tenth timer.

Optionally, the method also includes:

Sending second parameter information to the network device, so that the network device optimizes a topology structure according to the second parameter information.

Optionally, the method also includes:

Sending the second parameter information to the network device.

Wherein, the second node sends the obtained second parameter information to the network device, so that the network device can optimize the topology structure according to the second parameter information.

In addition, the optimizing topology includes adjusting routing lines in the topology, and/or modifying network parameters of nodes in the topology.

For example, after RLF is detected for the second node, the second parameter information obtained by the second node indicates that the number of RLF occurrences of the second node on a certain routing line is relatively frequent, and the network device may adjust the second node to another routing line, or modify the network parameters of the second node and its parent node where the RLF occurs, so as to realize the optimization of the topology structure and improve the communication quality.

In addition, when the first node and the second node are both IAB nodes, the network device may be an IAB donor.

Optionally, the method also includes:

sending third parameter information to the network device;

Wherein, the third parameter information includes at least one of the following:

A sending result indication recorded when RLF is detected for the second node, wherein the sending result indication is used to indicate whether the indication is sent to a child node of the second node;

Various indications sent to child nodes of the second node recorded when RLF is detected for the second node;

The cell identifier of the node that receives the indication, which is recorded when the RLF is detected for the second node.

Wherein, the third parameter information may be sent to the network device together with the second parameter information, or may be sent to the network device separately. For example, at least one of the third parameter information and the second parameter information may be added to the RLF report, so that the RLF report is sent to the network device.

It can be known that at least one of the above-mentioned second parameter information and third parameter information may be added to the RLF report.

Optionally, the sending the second parameter information to the network device includes:

Sending the obtained second parameter information to the network device at every second preset time interval;

or

When the request information sent by the network device has been received, sending the obtained second parameter information to the network device;

or

When the preset second timer expires, sending the obtained second parameter information to the network device;

or

For receiving the indication, if the number of sending times of the K indications respectively reaches the threshold value of the K indications, sending the obtained second parameter information to the network device, where M is a number of types of the indications, K is an integer from 1 to M.

Wherein, the threshold value of each indication in the K types of indications may be the same or different.

It can be seen from this that when the preset period arrives, or when the second node receives the request information from the network device, or when the preset second timer times out, or when the number of sending times of the K types of indications respectively reaches the threshold value of the K types of indications is reached, the second node may send the accumulated obtained second parameter information to the network device.

As can be seen from the above, in the embodiments of the present application, when the RLF is detected for the parent node of an IAB node and its child nodes is notified of connection failure related indications, the parent node of the IAB node can perform statistics on received indications and collect related information, That is to obtain the second parameter information used to optimize the topology structure composed of IAB nodes, so that the second parameter information can be reported to the IAB donor later, and the IAB donor adjusts the routing lines of the topology structure composed of IAB nodes or optimize the network parameter of the node in the topology structure.

In a word, in the embodiment of the present application, when RLF occurs to the parent node of an IAB node, the IAB node will receive the related indication that the RLF is detected for the parent node sent by the parent node, thereby triggering at least one of the IAB node and the parent node of the IAB node to obtain parameter information for optimizing the topology structure composed of the IAB nodes. Therefore, the embodiments of the present application implement a mechanism for collecting information for optimizing the topology structure of the IAB nodes.

Figure 6:
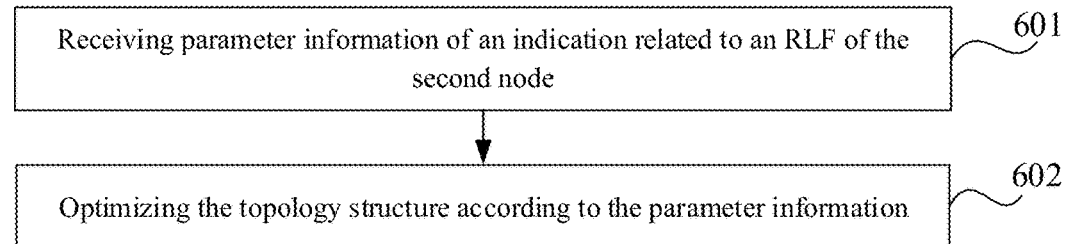
FIG. 6 is a flowchart of an information processing method applied to a network device provided by an embodiment of the present application.

FIG. 6 shows a schematic flowchart of an information obtaining method provided by an embodiment of the present application. This triggeredhod is applied to a network device. As shown in FIG. 6, the method may include the following steps:

Step 601: Receiving parameter information of an indication related to a radio link failure (RLF) of the second node.

Wherein, the parameter information is sent by a first node and/or a second node, the second node being a parent node of the first node, and the parameter information is used to optimize a topology structure.

Optionally, both the first node and the second node are IAB nodes, and the network device is an IAB donor.

Step 602: Optimizing the topology structure according to the parameter information.

Wherein, the optimizing topology structure includes adjusting routing lines in the topology structure, and/or modifying network parameters of nodes in the topology structure.

For example, after RLF is detected for the second node, the above parameter information indicates that the number of RLF occurrences at the second node on a certain routing line is relatively frequent, and the network device can adjust the second node to another routing line, or modify the network parameters of the second node and the parent node where RLF occurs, so as to optimize the topology structure and improve the communication quality.

In addition, for the parameter information sent by the first node to the network device, that is, the relevant description of the first parameter information, refer to the method part of the first node side, and will not be repeated here. For details about the parameter information sent by the second node to the network device, i.e., the second parameter information, refer to the method part on the second node side, and will not be repeated here.

It can be seen that, in the embodiment of the present application, in the case where RLF is detected for the second node, the first node will receive an indication related to the RLF of the second node sent by the second node, thereby triggering at least one of the first node and the second node to obtain the parameter information for optimizing the topology structure including the first node and the second node according to the indication, wherein the second node is a parent node of the first node. It can be seen that, in the embodiment of the present application, when RLF is detected for the parent node of a node, the parent node will send an indication related to the RLF of the parent node to the child node, thereby triggering at least one of the node and the parent node of the node to obtain the parameter information for optimizing the topology structure according to the indication, thereby realizing the information collection mechanism for optimizing the topology structure. Afterwards, the parent node and/or the child node may send the obtained parameter information to the network device, so that the network device optimizes the topology structure according to the parameter information. In turn, the communication quality of the topology can be improved.

To sum up, the specific implementations of the information obtaining method in the embodiment of the present application are described in Embodiments 1 to 10 below.

Among them, in order to facilitate understanding, some information in the following implementation is firstly introduced as follows:

In the first aspect, the third node is the parent node of the second node, the second node is the parent node of the first node, and the first node, the second node and the third node are all IAB nodes. Moreover, the RLF of the second node as described below means that the radio link between the third node and the second node fails.

In the second aspect, for the convenience of description, the first indication mentioned in the method introduction above is abbreviated as: indication a, the second indication is abbreviated as: indication b, the third indication is abbreviated as: indication c, and the fourth indication is abbreviated as is: indication d, and the fifth indication is abbreviated as: indication e.

In the third aspect, the starting and end timing moments of the respective timers described below are as follows:

For the first timer, the starting timing moment is the moment that the first node is connected to the second node, or the moment that the first node receives the first indication, and the end timing moment is the moment that the first node reports the first parameter information to the IAB donor, or the moment that the condition for the first node to send the first parameter information to the IAB donor is triggered, or the moment that the RLF is detected for the first node;

For the second timer, the starting timing moment is the receiving moment that the last indication a or indication b is received before the indication c is received, and the end timing moment is the moment that the indication c is received;

For the third timer, the starting timing moment is the receiving moment of the last indication a or indication b is received before the indication e is received, and the end timing moment is the moment that the indication e is received;

For the fourth timer, the starting timing moment is the moment that the RLF is detected for the first node, or the moment that the indication d is received, and the end timing moment is the moment that the first node reports the first parameter information to the IAB donor, or the moment that the condition that the first node will send the first parameter message to the IAB donor is triggered.

For the fifth timer, the starting timing moment is the receiving moment of the last indication a orb before receiving the indication d, and the end timing moment is the receiving moment of the indication d.

For the sixth timer, the starting timing moment is the moment that the second node is connected to the third node, or the moment that the second node sends the first indication, and the end timing moment is the moment that the second node reports the second parameter information to the IAB donor, or the moment that the condition for the second node to send the second parameter information to the IAB donor is triggered, or the moment that the RLF is detected for the second node;

For the seventh timer, the starting timing moment is the sending moment of the last indication a or indication b before sending the indication c, and the end timing moment is the moment that the indication c is sent;

For the eighth timer, the starting timing moment is the sending moment of the last indication a or indication b before sending the indication e, and the end timing moment is the moment that the indication e is sent;

For the ninth timer, the starting timing moment is the moment when RLF is detected for the second node, and the end timing moment is the moment that the second node reports the second parameter information to the IAB donor, or the moment that the condition that the second node sends the second parameter information to the IAB donor is triggered.

For the tenth timer, the starting timing moment is the sending moment of the last indication a or b before sending the indication d, and the end timing moment is the sending moment of the indication d.

Embodiment 1: A scenario where the first node receives the indication a or the indication b and then receives the indication c, and does not declare RLF.

Figure 7:
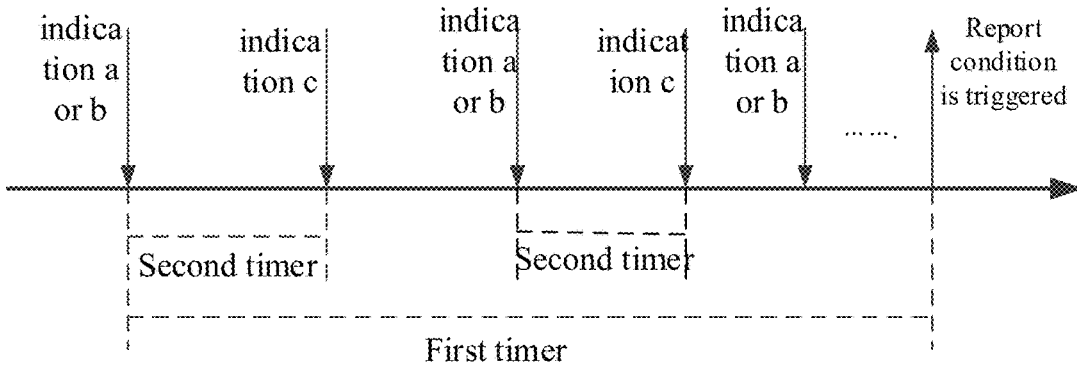
FIG. 7 is the first schematic diagrams of the implementation of the information obtaining method provided by the embodiment of the present application.

As shown in FIG. 7, the first node is connected to the second node, and the second node generates an RLF, and sends an indication a or an indication b to the first node.

Wherein, when the first node receives the indication a or the indication b sent by the second node, it starts to perform statistics on the received indications, and adds 1 to the counter of the corresponding indication, and starts the first timer, the second timer, the third timer or fifth timer at the same time.

If the first node receives the indication a or the indication b and then receives the indication c, the second timer is stopped, and the duration of the second timer is recorded. If the indication a or the indication b is received again subsequently, the second timer, the third timer and the fifth timer are started or restarted again. Wherein, if the first node does not receive the indication e and the indication d, the duration of the third timer and the duration of the fifth timer are not recorded.

In addition, when the condition for the first node to report the first parameter information to the IAB donor is triggered, the first node stops the first timer and records the following information:

The duration of the first timer, the statistical indication and the corresponding statistical times, the C-RNTI of the first node, the cell identifier of the second node, and the measurement results of the primary cell and the measurement results of neighboring cells when the condition for first node to report the first parameter information to the IAB donor is triggered.

In addition, if RLF occurs before the first node reports the first parameter information to the IAB donor, it can also record the cell identifier of the reestablishment and reconnection the first node, and records the measurement results of the primary cell and the neighbor information when RLF occurs, and the primary cell identifier when RLF is detected for the first node. Moreover, the first node can also start the fourth timer when RLF is detected for the first node, and stop the fourth timer when the condition that the first node reports the first parameter information to the IAB donor is triggered, and record the duration of the fourth timer.

Among them, at least one of the above information recorded by the first node can be sent to the IAB donor as the first parameter information for optimizing the topology structure of the IAB node, so that the IAB donor can be used to adjust the corresponding topology structure and perform parameter optimization.

It should be noted here that when the condition for the first node to report the first parameter information to the IAB donor is triggered, the first node will report the statistical information to the IAB donor.

In addition, the condition for the first node to report the first parameter information to the IAB donor may be one of the following:

The preset period arrives, the first node receives the request information of IAB donor, the preset timer times out, the number of receiving times of one kind of indication reaches its threshold value, the number of receiving times of two kinds of indication reaches the corresponding threshold value of each indication, the number of receiving times of three kinds of indication reaches the corresponding threshold value of each indication, the number of receiving times of fourth kinds of indication reaches the corresponding threshold value of each indication, the number of receiving times of five kinds of indication reaches the corresponding threshold value of each indication.

Embodiment 2: A scenario where the first node receives the indication e after receiving the indication a or the indication b, and declares RLF.

Figure 8:
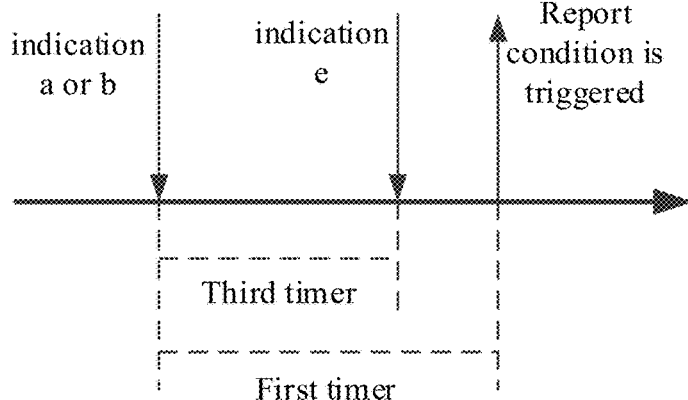
FIG. 8 is the second schematic diagram of the implementation of the information obtaining method provided by the embodiment of the present application.

As shown in FIG. 8, the first node is connected to the second node, the RLF is detected for the second node, and sends an indication a or an indication b to the first node.

Wherein, when the first node receives the indication a or the indication b sent by the second node, it starts to perform statistics on the received indications, and adds 1 to the timer of the corresponding indication, and starts the first timer, the second timer or the third timer or the fifth timer at the same time.

If the first node receives the indication a or the indication b, then receives the indication e, the third timer is stopped, and the duration of the third timer is recorded. At this time, the first node declares RLF and records the RLF Report. Wherein, if the first node does not receive the indication c and the indication d, the duration of the second timer and the duration of the fifth timer are not recorded.

When the condition for the first node to report the first parameter information to the IAB donor is triggered, the first node stops the first timer and records the following information:

The duration of the first timer, the statistical indication and the corresponding statistical times, the C-RNTI of the first node, the cell identifier of the second node, and the measurement result of the primary cell and the measurement result of the neighboring cell when the first node meets the condition of reporting the first parameter information to the IAB donor.

In addition, if RLF is detected for the first node before the first node reports the first parameter information to the IAB donor, it can also record the cell identifier of the reestablishment and reconnection of the first node, and records the measurement results of the primary cell and the neighbor information when RLF occurs, and the primary cell identifier when RLF is detected for the first node. Moreover, the first node can also start the fourth timer when RLF is detected for the first node, and stop the fourth timer when the condition that the first node reports the first parameter information to the IAB donor is triggered, and record the duration of the fourth timer.

Wherein, the at least one kind of information recorded by the first node may be sent to the IAB donor as the first parameter information for optimizing the topology structure formed by the IAB nodes. Specifically, the first node may add the first parameter information to the RLF report, and then send the RLF report to the IAB donor, or may report the first parameter information independently of the RLF report together with the RLF report or separately to the IAB donor.

Embodiment 3: A scenario where the first node receives both the indication c and the indication e.

Figure 9:
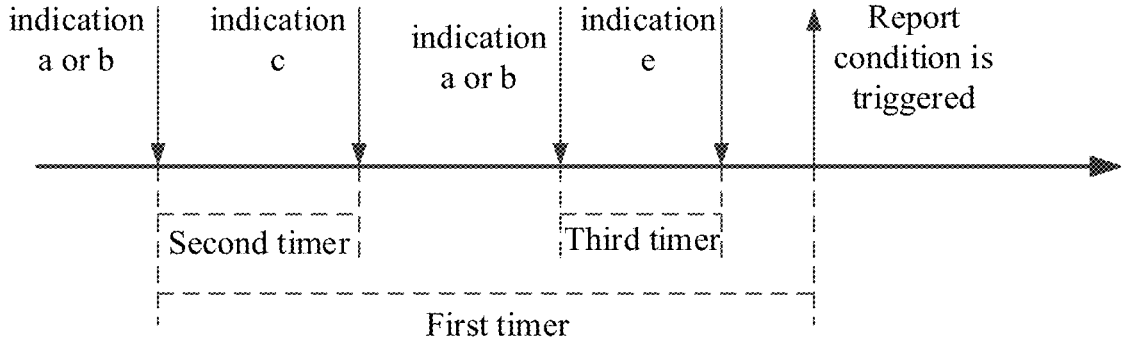
FIG. 9 is the third schematic diagram of the implementation of the information obtaining method provided by the embodiment of the present application.

As shown in FIG. 9, the first node is connected to the second node, the RLF is detected for the second node, and an indication a or an indication b is sent to the first node.

Wherein, when the first node receives the indication a or the indication b sent by the second node, it starts to perform statistics on the received indications, and adds 1 to the timer of the corresponding indication, and starts the first timer, the second timer or the third timer or the fifth timer at the same time.

If the first node receives indication a or indication b, then receives indication c, stop the second timer and record the duration of the second timer; then the first node receives indication a or b again, then start or restart the third timer, the second timer and the fifth timer, and receive the indication e afterwards, the third timer is stopped, and the duration of the third timer is recorded. Wherein, if the first node does not receive the indication d, the duration of the fifth timer is not recorded.

When the condition for the first node to report the first parameter information to the IAB donor is triggered, the first node stops the first timer and records the following information:

The duration of the first timer, the statistical indication and the corresponding statistical times, the C-RNTI of the first node, the cell identifier of the second node, and the measurement result of the primary cell and the measurement result of the neighboring cell when the first node meets the condition of reporting the first parameter information to the IAB donor.

In addition, if RLF is detected for the first node before the first node reports the first parameter information to the IAB donor, it can also record the cell identifier of the reestablishment and reconnection of the first node, and records the measurement results of the primary cell and the neighbor information when RLF occurs, and the primary cell identifier when RLF is detected for the first node. Moreover, the first node can also start the fourth timer when RLF is detected for the first node, and stop the fourth timer when the condition that the first node reports the first parameter information to the IAB donor is triggered, and record the duration of the fourth timer.

Wherein, the at least one kind of information recorded by the first node may be sent to the IAB donor as the first parameter information for optimizing the topology structure formed by the IAB nodes, so that the IAB donor can be used to adjust the corresponding topology structure and perform parameter optimization.

Embodiment 4: the scenario that after the first node receives the indication d and the indication a at the same time, or receives the indication d and the indication b at the same time, it declares the RLF.

Figure 10:
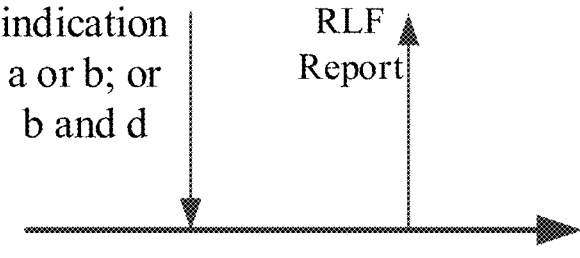
FIG. 10 is the fourth schematic diagram of the implementation of the information obtaining method provided by the embodiment of the present application.

As shown in FIG. 10, the first node is connected to the second node, the RLF is detected for the second node, and an indication a or an indication b, or indication b and indication d are sent to the first node.

Wherein, when the first node receives the indication a or the indication b, it starts to perform statistics on the received indications, and adds 1 to the timer of the corresponding indication, and starts the first timer, the second timer or the third timer. The first node declares RLF and records the RLF report.

If the first node does not receive indication c and indication e, the duration of the second timer and the duration of the timer is not recorded. The first node receives indication a and indication d at the same time or receives indication b and indication d at the same time, then the duration of the fifth timer is zero.

When the condition for the first node to report the first parameter information to the IAB donor is triggered, the first node stops the first timer and records the following information:

The duration of the first timer, the statistical indication and the corresponding statistical times, the C-RNTI of the first node, the cell identifier of the second node, and the measurement result of the primary cell and the measurement result of the neighboring cell when the first node meets the condition of reporting the first parameter information to the IAB donor.

In addition, if RLF is detected for the first node before the first node reports the first parameter information to the IAB donor, it can also record the cell identifier of the reestablishment and reconnection of the first node, and records the measurement results of the primary cell and the neighbor information when RLF occurs, and the primary cell identifier when RLF is detected for the first node. Moreover, the first node can also start the fourth timer when RLF is detected for the first node, and stop the fourth timer when the condition that the first node reports the first parameter information to the IAB donor is triggered, and record the duration of the fourth timer.

Wherein, the at least one kind of information recorded by the first node may be sent to the IAB donor as the first parameter information for optimizing the topology structure formed by the IAB nodes. Specifically, the first node may add the first parameter information to the RLF report, and then send the RLF report to the IAB donor, or may report the first parameter information independently of the RLF report together with the RLF report or separately to IAB donor.

In addition, when RLF is detected for the first node, the first node may also add failure cause indication information in the RLF report, and the failure cause indication information is used to indicate that the identification reason for RLF of the first node is the receipt of indications a and d or b and d, or RLF is detected for the second node.

Embodiment 5: the scenario that after receiving the indication a or the indication b, the first node then receives the indication d, and declares the RLF.

Figure 11:
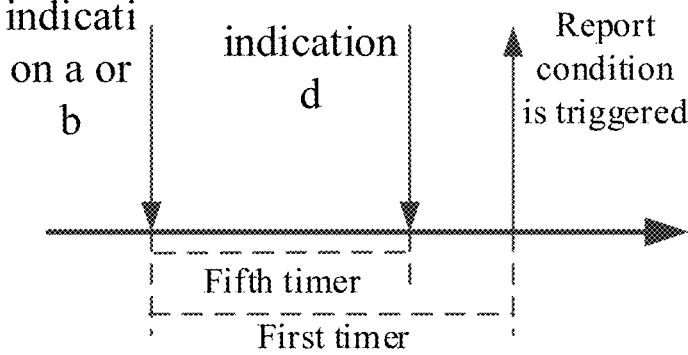
FIG. 11 is the fifth schematic diagram of the implementation of the information obtaining method provided by the embodiment of the present application.

As shown in FIG. 11, the first node is connected to the second node, and RLF is detected for the second node, and sends an indication a or an indication b to the first node.

Wherein, when the first node receives the indication a or the indication b sent by the second node, it starts to perform statistics on the received indications, and adds 1 to the timer of the corresponding indication, and starts the first timer, the second timer or the third timer or the fifth timer at the same time.

If the first node receives indication a or indication b, then receives indication d, stop the fifth timer and record the duration of the fifth timer; at this time the first node declares the RLF and records RLF report. When the RLF is detected for the first node, the first node may also add failure cause indication information in the RLF Report, and the failure cause indication information is used to indicate that the reason for RLF failure at the first node is that the received indication d or the RLF is detected for the parent node.

Wherein, if the first node does not receive the indication c and the indication e, the duration of the second timer and the duration of the third timer are not recorded.

When the condition for the first node to report the first parameter information to the IAB donor is triggered, the first node stops the first timer and records the following information:

The duration of the first timer, the statistical indication and the corresponding statistical times, the C-RNTI of the first node, the cell identifier of the second node, and the measurement result of the primary cell and the measurement result of the neighboring cell when the first node meets the condition of reporting the first parameter information to the IAB donor.

In addition, if RLF is detected for the first node before the first node reports the first parameter information to the IAB donor, it can also record the cell identifier of the reestablishment and reconnection of the first node, and records the measurement results of the primary cell and the neighbor information when RLF occurs, and the primary cell identifier when RLF is detected for the first node. Moreover, the first node can also start the fourth timer when RLF is detected for the first node, and stop the fourth timer when the condition that the first node reports the first parameter information to the IAB donor is triggered, and record the duration of the fourth timer.

Wherein, the at least one kind of information recorded by the first node may be sent to the IAB donor as the first parameter information for optimizing the topology structure formed by the IAB nodes, so that the IAB donor can be used to adjust the corresponding topology structure and perform parameter optimization. Specifically, the first node may add the first parameter information to the RLF report, and then send the RLF report to the IAB donor, or may report the first parameter information independently of the RLF report together with the RLF report or separately to IAB donor.

Embodiment 6: A scenario where the first node declares RLF after receiving the indication a or the indication b.

Figure 12:
FIG. 12 is the sixth schematic diagram of the implementation of the information obtaining method provided by the embodiment of the present application.

As shown in FIG. 12, the first node is connected to the second node, and RLF is detected for the second node, and sends an indication a or an indication b to the first node.

Wherein, when the first node receives the indication a or the indication b sent by the second node, it starts to perform statistics on the received indications, and adds 1 to the timer of the corresponding indication, and starts the first timer, the second timer or the third timer or the fifth timer at the same time. The first node declares RLF and records RLF report.

If the first node does not receive indication c, indication e or indication d, then the duration of the second timer, the duration of the third timer and the duration of the fifth timer are not recorded.

When the condition for the first node to report the first parameter information to the IAB donor is triggered, the first node stops the first timer and records the following information:

The duration of the first timer, the statistical indication and the corresponding statistical times, the C-RNTI of the first node, the cell identifier of the second node, and the measurement result of the primary cell and the measurement result of the neighboring cell when the first node meets the condition of reporting the first parameter information to the IAB donor.

In addition, if RLF is detected for the first node before the first node reports the first parameter information to the IAB donor, it can also record the cell identifier of the reestablishment and reconnection of the first node, and records the measurement results of the primary cell and the neighbor information when RLF occurs, and the primary cell identifier when RLF is detected for the first node. Moreover, the first node can also start the fourth timer when RLF is detected for the first node, and stop the fourth timer when the condition that the first node reports the first parameter information to the IAB donor is triggered, and record the duration of the fourth timer.

Wherein, the at least one kind of information recorded by the first node may be sent to the IAB donor as the first parameter information for optimizing the topology structure formed by the IAB nodes. Specifically, the first node may add the first parameter information to the RLF report, and then send the RLF report to the IAB donor, or may report the first parameter information independently of the RLF report together with the RLF report or separately to IAB donor.

In addition, when RLF is detected for the first node, the first node may also add the first parameter information to the RLF report, and add failure cause indication information in the RLF report, where the failure cause indication information is used to indicate that the identification reason of the RLF of first node is the received indication a or indication b, or RLF is detected for the second node.

Embodiment 7: A scenario where RLF is detected for the second node and RLF does not are detected for the first node.

Figure 13:
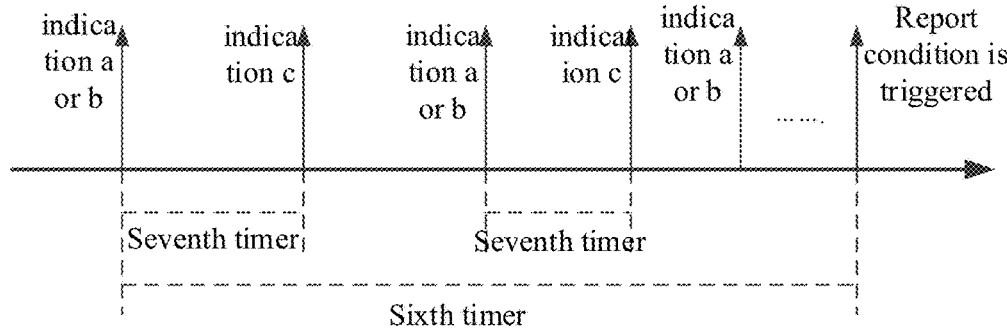
FIG. 13 is the seventh schematic diagram of the implementation of the information obtaining method provided by the embodiment of the present application.

As shown in FIG. 13, RLF occurs after the second node is connected to its parent node (that is, the third node), and the second node sends an indication a or b to the first node;

Wherein, after the second node sends the indication a or the indication b, it starts to perform statistics on the sent indications, and adds 1 to the timer of the corresponding indication, records the cell identifier where the RLF occurs, and starts the sixth timer, the seventh timer or the eighth timer or the tenth timer at the same time.

After the second node sends indication a or indication b, then sends indication c, the second node stops the seventh timer and record the duration of the seventh timer; if the second node sends the indication a or indication b again, then the cell identifier where the RLF occurs is recorded again and stat or restart the seventh timer, the eighth timer and the tenth timer. The second node does not send the indication e and the indication d, the duration of the eighth timer and the duration of the tenth timer are not recorded.

When the condition for the second node to report the second parameter information to the IAB donor is triggered, the second node stops the sixth timer and records the following information:

The duration of the sixth timer, the statistical indications and the statistical times of the corresponding indications, the cell ID receiving the indication, the cell ID of the node associated with each indication, the C-RNTI of the second node, the primary cell identifier when RLF is detected for the second node, the cell identifier of the reestablishment and reconnection of the second node, the measurement results of the primary cell and neighboring cells when RLF is detected for the second node, and the measurement results of the primary cell and the measurement results of neighboring cells when the conditions for the second node to report the second parameter information to the IAB donor are met (wherein, the node associated with the indication is a node other than the second node among the nodes to which the RLF indicated by the indication belongs. In this embodiment, RLF occurs between the second node and the third node, Therefore, the nodes associated with the indication that are detected for the second node are all the third nodes.)

Moreover, the second node can also start the ninth timer when RLF occurs on the second node, and stop the ninth timer when the condition that the second node reports the second parameter information to the IAB donor is triggered, and record the duration of the ninth timer.

Wherein, the at least one kind of information recorded by the second node can be sent to the IAB donor as the second parameter information for optimizing the topology structure of the IAB node, so that the IAB donor can be used to adjust the corresponding topology structure and perform parameter optimization.

Embodiment 8: the scenario that after RLF is detected for the second node, RLF occurs after the first node successively receives indication c and indication e.

Figure 14:
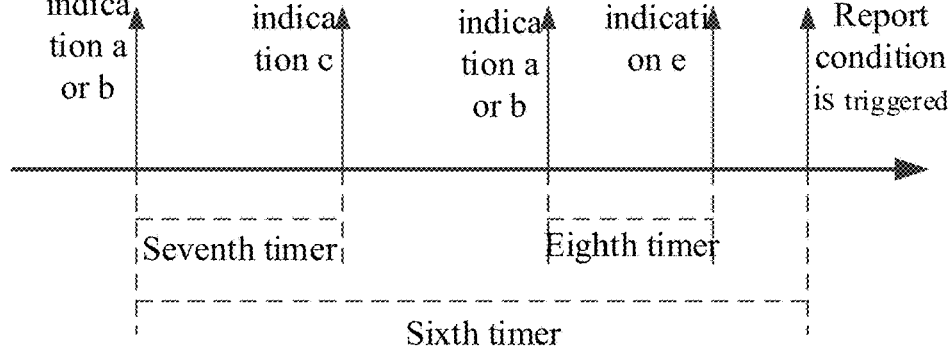
FIG. 14 is the eighth schematic diagram of the implementation of the information obtaining method provided by the embodiment of the present application.

As shown in FIG. 14, RLF occurs after the second node is connected to its parent node (that is, the third node), and the second node sends an indication a or b to the first node;

Wherein, after the second node sends the indication a or b, it starts to perform statistics on the sent indications, adds 1 to the corresponding timer of indication, records the cell identifier where RLF occurs, and starts the sixth timer, the seventh timer or the eighth timer or the tenth timer at the same time.

After the second node sends indication a or indication b, and then sends the indication c, the second node stops the seventh timer and records the duration of the seventh timer; if the RLF is detected for the second node subsequently again and sends indication a or indication b, then record the cell identifier where the RLF occurred again, and start or restart the seventh timer, the eighth timer and the tenth timer. Subsequently, if the second node sends an indication e, the eighth timer is stopped, and the duration of the eighth timer is recorded. Wherein, if the second node does not send the indication d, the duration of the tenth timer is not recorded.

When the condition for the second node to report the second parameter information to the IAB donor is triggered, the second node stops the sixth timer and records the following information:

The duration of the sixth timer, the statistical indications and the statistical times of the corresponding indications, the cell ID receiving the indication, the cell ID of the node associated with each indication, the C-RNTI of the second node, the primary cell identifier when RLF is detected for the second node, the cell identifier of the reestablishment and reconnection of the second node, the measurement results of the primary cell and neighboring cells when RLF is detected for the second node, and the measurement results of the primary cell and the measurement results of neighboring cells when the conditions for the second node to report the second parameter information to the IAB donor are met.

Moreover, the second node can also start the ninth timer when RLF occurs on the second node, and stop the ninth timer when the condition that the second node reports the second parameter information to the IAB donor is triggered, and record the duration of the ninth timer.

Wherein, the at least one kind of information recorded by the second node can be sent to the IAB donor as the second parameter information for optimizing the topology structure of the IAB node, so that the IAB donor can be used to adjust the corresponding topology structure and perform parameter optimization.

Embodiment 9: the scenario that after RLF is detected for the second node, RLF occurs after the first node does not receive indication c, but only receives indication e.

Figure 15:
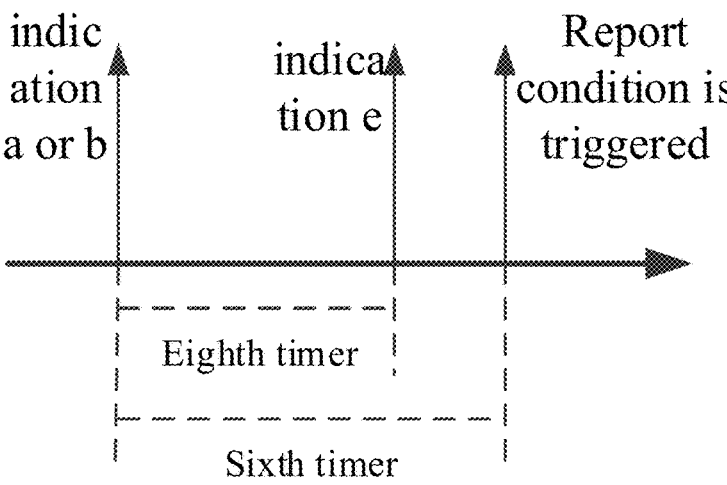
FIG. 15 is the ninth schematic diagram of the implementation of the information obtaining method provided by the embodiment of the present application.

As shown in FIG. 15, RLF occurs after the second node is connected to its parent node (that is, the third node), and the second node sends an indication a or b to the first node;

Wherein, after the second node sends the indication a or b, it starts to perform statistics on the sent indications, adds 1 to the corresponding timer of indication, records the cell identifier where RLF occurs, and starts the sixth timer, the seventh timer or the eighth timer or the tenth timer at the same time.

After the second node sends indication a or indication b, and then sends the indication e, the second node stops the eighth timer and records the duration of the eighth timer; since the second node does not send the indication c and the indication d, the duration of the seventh timer and the duration of the tenth timer.

When the condition for the second node to report the second parameter information to the IAB donor is triggered, the second node stops the sixth timer and records the following information:

The duration of the sixth timer, the statistical indications and the statistical times of the corresponding indications, the cell ID receiving the indication, the cell ID of the node associated with each indication, the C-RNTI of the second node, the primary cell identifier when RLF is detected for the second node, the cell identifier of the reestablishment and reconnection of the second node, the measurement results of the primary cell and neighboring cells when RLF is detected for the second node, and the measurement results of the primary cell and the measurement results of neighboring cells when the conditions for the second node to report the second parameter information to the IAB donor are met.

Moreover, the second node can also start the ninth timer when RLF occurs on the second node, and stop the ninth timer when the condition that the second node reports the second parameter information to the IAB donor is triggered, and record the duration of the ninth timer.

Wherein, the at least one kind of information recorded by the second node can be sent to the IAB donor as the second parameter information for optimizing the topology structure of the IAB node, so that the IAB donor can be used to adjust the corresponding topology structure and perform parameter optimization. Specifically, the second node may add the second parameter information to the RLF report, and then send the RLF report to the IAB donor, or may report the second parameter information independently of the RLF report together with the RLF report or separately to IAB donor.

Embodiment 10: A scenario where the first node declares RLF after the second node sends the indication d and the indication a at the same time, or sends the indication d and the indication b at the same time.

Figure 16:
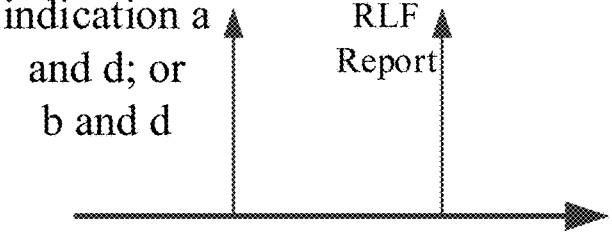
FIG. 16 is a tenth schematic diagram of the implementation of the information obtaining method provided by the embodiment of the present application.

As shown in FIG. 16, RLF occurs after the second node is connected to its parent node (that is, the third node), and the second node sends indication d and indication a, or indication d and indication b to the first node at the same time, and declares RLF, record the RLF Report.

Wherein, after the second node sends the indication a or b, it starts to perform statistics on the sent indications, adds 1 to the corresponding timer of indication, records the cell identifier where RLF occurs, and starts the sixth timer, the seventh timer or the eighth timer or the tenth timer at the same time.

In addition, when the second node does not send indication c or indication e, and the duration of the seventh timer and the duration of the eighth timer are not recorded. When the second node sends indication d and indication a at the same time or sends the indication d and the indication b at the same time, then the duration of the tenth timer is zero.

When the condition for the second node to report the second parameter information to the IAB donor is triggered, the second node stops the sixth timer and records the following information:

The duration of the sixth timer, the statistical indications and the statistical times of the corresponding indications, the cell ID receiving the indication, the cell ID of the node associated with each indication, the C-RNTI of the second node, the primary cell identifier when RLF is detected for the second node, the cell identifier of the reestablishment and reconnection of the second node, the measurement results of the primary cell and neighboring cells when RLF is detected for the second node, and the measurement results of the primary cell and the measurement results of neighboring cells when the conditions for the second node to report the second parameter information to the IAB donor are met.

Moreover, the second node can also start the ninth timer when RLF occurs on the second node, and stop the ninth timer when the condition that the second node reports the second parameter information to the IAB donor is triggered, and record the duration of the ninth timer.

In addition, the second node may also add at least one of the following information to the RLF Report:

A sending result indication recorded when RLF is detected for the second node, where the sending result indication is used to indicate whether an indication is sent to a child node of the second node;

Various indications sent to the child nodes of the second node and recorded when RLF is detected for the second node;

The cell identifier of the node that receives the indication, and is recorded when the RLF is detected for the second node.

The cell identifier of the child node connected to the second node.

Wherein, the at least one kind of information recorded by the second node can be sent to the IAB donor as the second parameter information for optimizing the topology structure composed of the IAB node, so that the IAB donor can be used to adjust the corresponding topology structure and perform parameter optimization. Specifically, the second node may add the second parameter information to the RLF report, and then send the RLF report to the IAB donor, or may report the second parameter information independently of the RLF report together with the RLF report or separately to IAB donor.

The information obtaining method provided by the embodiment of the present application is described above, and the information obtaining device provided by the embodiment of the present application will be described below with reference to the accompanying drawings.

Figure 17:
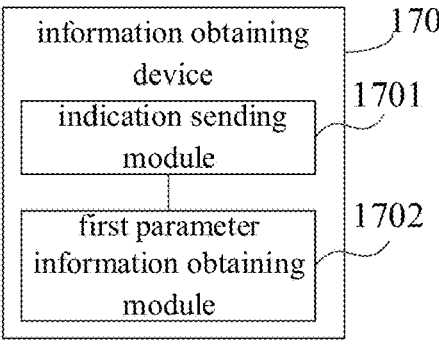
FIG. 17 is a structural block diagram of an information obtaining device applied to a first node provided by an embodiment of the present application.

Referring to FIG. 17, an embodiment of the present application also provides an information obtaining device, which is applied to a first node, and the information obtaining device 170 includes the following modules:

an indication sending module 1701, configured to, in a case that a radio link failure (RLF) is detected for a second node, receive an indication related to RLF of the second node sent by the second node;

a first parameter information obtaining module 1702, configured to obtain first parameter information for optimizing a topology structure according to the indication, wherein the topology structure includes the first node and the second node.

Optionally, an embodiment of the present application provides an information obtaining device, which is applied to the first node, and the information obtaining device 170 includes the following modules:

an indication sending module 1701, configured to receive an indication related to the RLF of the second node sent by the second node when a radio link failure (RLF) is detected for the second node, wherein the second node is the parent node of the first node;

The first parameter information obtaining module 1702 is configured to obtain the indicated first parameter information.

Optionally, the indication includes at least one of the following indications:

a first indication, wherein the first indication is used to indicate that RLF is detected for the second node;

A second indication, wherein the second indication is used to indicate that the RLF is detected for second node and the second node is trying to recover a radio link;

A third indication, wherein the third indication is used to indicate that the second node succeeds recovery of the radio link;

a fourth indication, wherein the fourth indication is used to instruct the first node to perform RLF;

A fifth indication, where the fifth indication is used to indicate that the second node fails recovery of the radio link.

Optionally, the first parameter information includes at least one of the following:

each indication that is received, and a number of times the indication was received;

a duration of a first type of timer, wherein a timing parameter of the first type of timer used to determine the duration are determined according to a first target moment, and the first target moment includes receiving moments of various indications, a moment that the first node is connected to the second node, a moment that the first node sends the first parameter information to the network device, and a moment that a sending condition of the first node sending the first parameter information to the network device is triggered, and a moment that RLF is detected for the first node.

a measurement result of a primary cell at a first preset moment;

a measurement results of a neighboring cell at the first preset moment;

a radio network temporary identifier C-RNTI of the first node;

a cell identifier of the second node;

a primary cell identifier when RLF occurs;

a cell identifier of the reestablishment of the first node;

a cell identifier of the reconnection of the first node.

Wherein, the first preset moment includes at least one of the following:

a moment that RLF is detected for the first node;

a moment that the sending condition for the first node to send the first parameter information to the network device is triggered;

a moment that the first node sends the first parameter information to the network device.

Optionally, the first parameter information includes at least one of the following:

each indication that is received, a number of times the indication was received;

a duration of a first type of timer, wherein a timing parameter of the first type of timer used to determine the duration are determined according to a first target moment, and the first target moment includes receiving moments of various indications, a moment that the first node is connected to the second node, a moment that the first node sends the first parameter information to the network device, and a moment that a sending condition of the first node sending the first parameter information to the network device is triggered, and a moment that RLF is detected for the first node.

a measurement result of a primary cell at a first preset moment;

a measurement results of a neighboring cell at the first preset moment;

a radio network temporary identifier C-RNTI of the first node;

a cell identifier of the second node;

a primary cell identifier when RLF occurs;

a cell identifier of the reestablishment of the first node;

a cell identifier of the reconnection of the first node.

Wherein, the first preset moment includes at least one of the following:

a moment that RLF is detected for the first node;

a moment that the sending condition for the first node to send the first parameter information to the network device is triggered;

a moment that the first node sends the first parameter information to the network device.

Optionally, the timing parameters of the first type of timer determined according to the first target moment include at least one of the following:

If a starting timing moment in the timing parameters of the first type of timer is the moment that the first node is connected to the second node, or is the moment that the first node receives the first indication, then an end timing moment in the timing parameters of the first type of timer is the moment that the first node sends the first parameter information to the network device, or the moment that the sending condition of the first node sending the first parameter information to the network device is triggered, or the moment that RLF is detected for the first node;

If the starting timing moment in the timing parameters of the first type of timer is the receiving moment of the last first indication or the second indication before receiving the third indication, the end timing moment in the timing parameters of the first type of timer is the moment that the third indication is received;

If the starting timing moment in the timing parameters of the first type of timer is the receiving moment of the last first indication or the second indication before receiving the fifth indication, the end timing moment in the timing parameters of the firs type of timer is the moment that the fifth indication is received;

If the starting timing moment in the timing parameters of the first type of timer is the moment that RLF is detected for the first node or the moment that the fourth indication is received, the end timing moment in the timing parameters of the first type of timer is the moment that the first node sends the first parameter information to the network, or the moment that the sending condition of the first node sending the first parameter information to the network device is triggered;

If the starting timing moment in the timing parameters of the first type of timer is the receiving moment of the last first indication or the second indication before receiving the fourth indication, the end timing moment in the timing parameters of the first type of timer is the moment that the fourth indication is received.

Optionally, the device also includes:

A first parameter information sending module, configured to send the first parameter information to the network device, so that the network device optimizes the topology structure according to the first parameter information.

Optionally, the device also includes:

A first parameter information sending module, configured to send the first parameter information to the network device.

Optionally, the device also includes:

A cause information sending module, configured to, if the indication includes a preset indication, and the RLF is detected for the first node, send a failure cause indication to the network device;

Wherein, the failure cause indication is used to indicate that the RLF reason of the first node is the received preset indication, or that RLF is detected for the second node;

The preset indication includes at least one of the first indication, the second indication, the fourth indication, or the fifth indication.

Optionally, the first parameter information sending module is specifically configured to:

Send the obtained first parameter information to the network device every first preset time interval;

or

When receiving the request information sent by the network device, send the obtained first parameter information to the network device;

or

When the preset first timer expires, send the obtained the first parameter information to the network device;

or

For receiving the indication, if the number of sending times of N types of indications respectively reaches the threshold value of the N types of indications, send the obtained first parameter information to the network device, wherein M is a number of types of the indications, N is an integer from 1 to M.

Figure 18:
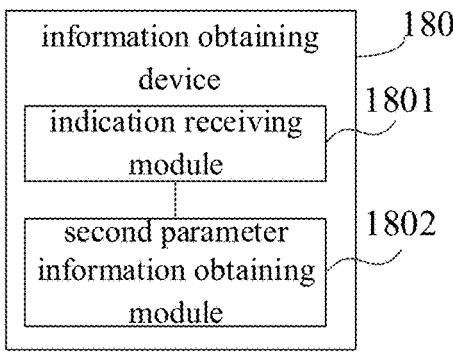
FIG. 18 is a structural block diagram of an information obtaining device applied to a second node provided by an embodiment of the present application.

Referring to FIG. 18, an embodiment of the present application also provides an information obtaining device, which is applied to a second node, and the information obtaining device 180 includes the following modules:

An indication receiving module 1801, configured to, in a case that a radio link failure (RLF) is detected for the second node, send an indication related to RLF of the second node to at least one first node;

a second parameter information obtaining module 1802, configured to obtain second parameter information for optimizing a topology structure according to the indication, wherein the topology structure includes the first node and the second node.

Optionally, an embodiment of the present application further provides an information obtaining device, which is applied to the second node, and the information obtaining device 180 includes the following modules:

An indication receiving module 1801, configured to send an indication related to the RLF of the second node to at least one first node when the RLF is detected for the second node, wherein the second node is a parent node of the first node;

a second parameter information obtaining module 1802, configured to obtain the indicated second parameter information.

Optionally, the indication includes at least one of the following indications:

a first indication, wherein the first indication is used to indicate that RLF is detected for the second node;

A second indication, wherein the second indication is used to indicate that the RLF is detected for second node and the second node is trying to recover a radio link;

A third indication, wherein the third indication is used to indicate that the second node succeeds recovery of the radio link;

a fourth indication, wherein the fourth indication is used to instruct the first node to perform RLF;

A fifth indication, where the fifth indication is used to indicate that the second node fails recovery of the radio link.

Optionally, the second parameter information includes at least one of the following first to tenth items:

each indication that is sent, a the number of times the indication was sent;

a cell identifier of a node receiving the indication;

a cell identifier of a node associated with each indication, wherein the associated node is a node other than the second node among the nodes to which the RLF indicated by the indication belongs;

a duration of the second type of timer, wherein the timing parameters of the second type of timer used to determine the duration are determined according to a second target moment, and the second target moment includes sending moments of various indications, a moment that the second node is connected to the third node, a moment that the second node sends the second parameter information to the network device, and a moment that a sending condition of the second node sending the second parameter information to the network device is triggered, a moment that RLF is detected for the second node, and the third node is the parent node where RLF is detected for the second node;

a measurement result of a primary cell at a second preset moment;

a measurement result of a neighboring cell at the second preset moment;

a radios network temporary identifier (C-RNTI) of the second node;

a cell identifier of the primary cell when RLF is detected for the second node;

a cell identifier of reestablishment of the second node;

a cell identifier of the reconnection of the second node.

Optionally, the second parameter information includes at least one of the following:

each indication that is sent;

a number of times the indication was sent;

a cell identifier of a node receiving the indication;

a cell identifier of a node associated with each indication, wherein the associated node is a node other than the second node among the nodes to which the RLF indicated by the indication belongs;

a duration of the second type of timer, wherein the timing parameters of the second type of timer used to determine the duration are determined according to a second target moment, and the second target moment includes sending moments of various indications, a moment that the second node is connected to the third node, a moment that the second node sends the second parameter information to the network device, and a moment that a sending condition of the second node sending the second parameter information to the network device is triggered, a moment that RLF is detected for the second node, and the third node is the parent node where RLF is detected for the second node;

a measurement result of a primary cell at a second preset moment;

a measurement result of a neighboring cell at the second preset moment;

a radios network temporary identifier (C-RNTI) of the second node;

a cell identifier of the primary cell when RLF is detected for the second node;

a cell identifier of reestablishment of the second node;

a cell identifier of the reconnection of the second node.

Optionally, the second preset moment includes at least one of the following:

a moment that RLF is detected for the second node;

A moment that the sending condition for the second node to send the second parameter information to the network device is triggered;

a moment that the second node sends the second parameter information to the network device.

Optionally, the timing parameters of the second type of timer determined according to the second target time include at least one of the following:

If the starting timing moment in the timing parameters of the second type of timer is the moment that the second node is connected to the third node, or is the moment that the second node sends the first indication, then the end timing moment in the timing parameters of the second type of timer is the moment that the second node sends the second parameter information to the network device, or the moment that the sending condition that the second node sends the second parameter information to the network device is triggered, or the moment when RLF is detected for the second node;

If the starting timing moment in the timing parameters of the second type of timer is the sending time of the last first indication or the second indication before sending the third indication, then the end timing moment in the timing parameter of the second type of timer is the moment that the third indication is sent;

If the starting timing moment in the timing parameters of the second type of timer is the sending time of the last first indication or the second indication before sending the fifth indication, the end timing moment in the timing parameter of the second type of timer is the moment that the fifth indication is sent;

If the starting timing moment in the timing parameters of the second type of timer is the moment that RLF is detected for the second node, then the end timing moment in the timing parameters of the second type of timer is the moment that the second node sends the second parameter information to the network device, or the moment that the sending condition for the second node to send the second parameter information to the network device is triggered;

If the starting timing moment in the timing parameters of the second type of timer is the sending time of the last first indication or the second indication before sending the fourth indication, the end timing moment in the timing parameters of the second type of timer the moment that the fourth indication is sent.

Optionally, the device also includes:

A second parameter information sending module, configured to send the second parameter information to the network device, so that the network device optimizes the topology structure according to the second parameter information.

Optionally, the device also includes:

The second parameter information sending module is configured to send the second parameter information to the network device.

Optionally, the device also includes:

a third parameter information sending module, configured to send third parameter information to the network device;

Wherein, the third parameter information includes at least one of the following:

A sending result indication recorded when RLF is detected for the second node, wherein the sending result indication is used to indicate whether the indication is sent to a child node of the second node;

Various indications sent to child nodes of the second node recorded when RLF is detected for the second node;

The cell identifier of the node that receives the indication, which is recorded when the RLF is detected for the second node.

Optionally, the second parameter information sending module is specifically configured to:

Send the obtained second parameter information to the network device at every second preset time interval;

or

When the request information sent by the network device has been received, send the obtained second parameter information to the network device;

or

When the preset second timer expires, send the obtained second parameter information to the network device;

or

For receiving the indication, if the number of sending times of the K indications respectively reaches the threshold value of the K indications, send the obtained second parameter information to the network device, where M is a number of types of the indications, K is an integer from 1 to M.

Figure 19:
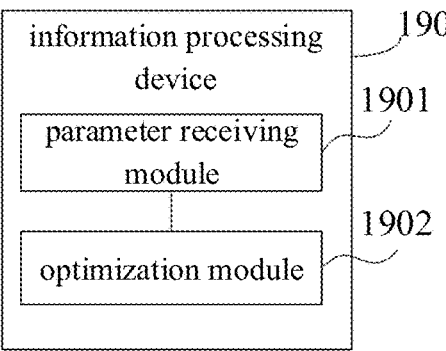
FIG. 19 is a structural block diagram of an information processing device applied to a network device provided by an embodiment of the present application.

Referring to FIG. 19, an embodiment of the present application also provides an information processing device, which is applied to a network device, and the information obtaining device 190 includes the following modules:

a parameter receiving module 1901, configured to receive parameter information for optimizing a topology structure, the parameter information is sent by a first node and/or a second node included in the topology structure, the second node is a parent node of the first node;

An optimization module 1902, configured to optimize the topology structure according to the parameter information.

Optionally, an embodiment of the present application also provides an information processing device, which is applied to a network device, and the information obtaining device 190 includes the following modules:

a parameter receiving module 1901, configured to receive parameter information related to an indication that a radio link failure RLF is detected for the second node, the parameter information is sent by the first node and/or the second node, and the second node is the parent node of the first node;

An optimization module 1902, configured to optimize the topology structure according to the parameter information.

It should be noted that the division of the units in the embodiment of the present application is schematic, and is only a logical function division, and there may be another division manner in actual implementation. In addition, each functional unit in each embodiment of the present application may be integrated into one processing unit, each unit may exist separately physically, or two or more units may be integrated into one unit. The above-mentioned integrated units can be implemented in the form of hardware or in the form of software functional units.

If the integrated unit is realized in the form of a software function unit and sold or used as an independent product, it can be stored in a processor-readable storage medium. Based on this understanding, the technical solution of the present application is essentially or part of the contribution to the prior art, or all or part of the technical solution can be embodied in the form of a software product, and the computer software product is stored in a storage medium, including several indications for causing a computer device (which may be a personal computer, server, or network device, etc.) or a processor to execute all or part of the steps of the methods described in various embodiments of the present application. The aforementioned storage medium include: U disk, mobile hard disk, read-only memory (ROM), random access memory (RAM), magnetic disk or optical disk and other medium that can store program codes.

What needs to be explained here is that the above-mentioned device provided by the embodiment of the present application can realize all the method steps realized by the above-mentioned method embodiment, and can achieve the same technical effect. The same part and the beneficial effect are not described in detail.

Figure 20:
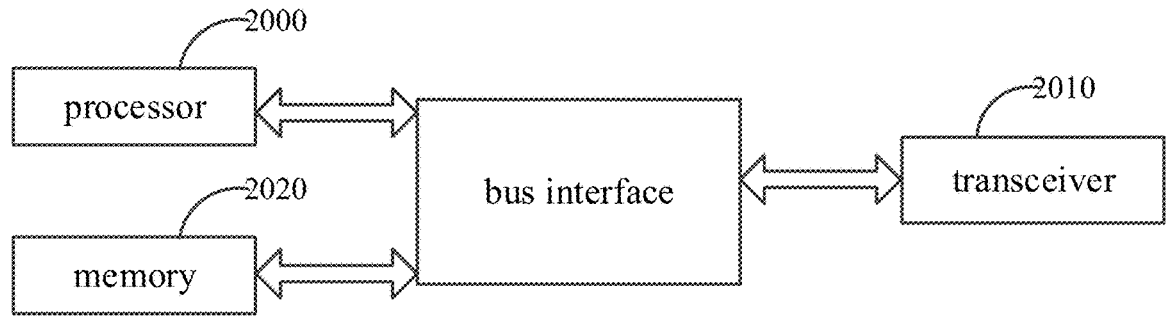
FIG. 20 is a structural block diagram of an apparatus provided by an embodiment of the present application.

An embodiment of the present application also provides a device, as shown in FIG. 20, the device includes a memory 2020, a transceiver 2010, and a processor 2000;

The memory 2020 is used to store computer programs;

The transceiver 2010 is used for receiving and sending data under the control of the processor 2000.

In the first aspect, when the device is applied to the first node, the processor 2000 is configured to read the computer program in the memory and perform the following operations:

In the case that a radio link failure (RLF) is detected for a second node, controlling the transceiver 2010 to receive an indication related to the RLF of the second node sent by the second node, wherein the second node is a parent node of the first node;

obtaining first parameter information for optimizing a topology structure according to the indication, wherein the topology structure includes the first node and the second node.

Optionally, when the device is applied to the first node, the processor 2000 is configured to read the computer program in the memory and perform the following operations:

In the case that a radio link failure (RLF) is detected for the second node, controlling the transceiver 2010 to receive an indication related to the RLF of the second node sent by the second node, wherein the second node is the parent node of the first node;

Obtaining the indicated first parameter information.

Optionally, the indication includes at least one of the following indications:

a first indication, wherein the first indication is used to indicate that RLF is detected for the second node;

A second indication, wherein the second indication is used to indicate that the RLF is detected for second node and the second node is trying to recover a radio link;

A third indication, wherein the third indication is used to indicate that the second node succeeds recovery of the radio link;

a fourth indication, wherein the fourth indication is used to instruct the first node to perform RLF;

A fifth indication, where the fifth indication is used to indicate that the second node fails recovery of the radio link.

Optionally, the first parameter information includes at least one of the following:

each indication that is received, and a number of times the indication was received;

a duration of a first type of timer, wherein a timing parameter of the first type of timer used to determine the duration are determined according to a first target moment, and the first target moment includes receiving moments of various indications, a moment that the first node is connected to the second node, a moment that the first node sends the first parameter information to the network device, and a moment that a sending condition of the first node sending the first parameter information to the network device is triggered, and a moment that RLF is detected for the first node.

a measurement result of a primary cell at a first preset moment;

a measurement results of a neighboring cell at the first preset moment;

a radio network temporary identifier C-RNTI of the first node;

a cell identifier of the second node;

a primary cell identifier when RLF occurs;

a cell identifier of the reestablishment of the first node;

a cell identifier of the reconnection of the first node.

Wherein, the first preset moment includes at least one of the following:

a moment that RLF is detected for the first node;

a moment that the sending condition for the first node to send the first parameter information to the network device is triggered;

a moment that the first node sends the first parameter information to the network device.

Optionally, the first parameter information includes at least one of the following:

each indication that is received, a number of times the indication was received;

a duration of a first type of timer, wherein a timing parameter of the first type of timer used to determine the duration are determined according to a first target moment, and the first target moment includes receiving moments of various indications, a moment that the first node is connected to the second node, a moment that the first node sends the first parameter information to the network device, and a moment that a sending condition of the first node sending the first parameter information to the network device is triggered, and a moment that RLF is detected for the first node.

a measurement result of a primary cell at a first preset moment;

a measurement results of a neighboring cell at the first preset moment;

a radio network temporary identifier C-RNTI of the first node;

a cell identifier of the second node;

a primary cell identifier when RLF occurs;

a cell identifier of the reestablishment of the first node;

a cell identifier of the reconnection of the first node.

Optionally, the first preset moment includes at least one of the following:

a moment that RLF is detected for the first node;

a moment that the sending condition for the first node to send the first parameter information to the network device is triggered;

a moment that the first node sends the first parameter information to the network device.

Optionally, the timing parameters of the first type of timer determined according to the first target moment include at least one of the following:

If a starting timing moment in the timing parameters of the first type of timer is the moment that the first node is connected to the second node, or is the moment that the first node receives the first indication, then an end timing moment in the timing parameters of the first type of timer is the moment that the first node sends the first parameter information to the network device, or the moment that the sending condition of the first node sending the first parameter information to the network device is triggered, or the moment that RLF is detected for the first node;

If the starting timing moment in the timing parameters of the first type of timer is the receiving moment of the last first indication or the second indication before receiving the third indication, the end timing moment in the timing parameters of the first type of timer is the moment that the third indication is received;

If the starting timing moment in the timing parameters of the first type of timer is the receiving moment of the last first indication or the second indication before receiving the fifth indication, the end timing moment in the timing parameters of the firs type of timer is the moment that the fifth indication is received;

If the starting timing moment in the timing parameters of the first type of timer is the moment that RLF is detected for the first node or the moment that the fourth indication is received, the end timing moment in the timing parameters of the first type of timer is the moment that the first node sends the first parameter information to the network, or the moment that the sending condition of the first node sending the first parameter information to the network device is triggered;

If the starting timing moment in the timing parameters of the first type of timer is the receiving moment of the last first indication or the second indication before receiving the fourth indication, the end timing moment in the timing parameters of the first type of timer is the moment that the fourth indication is received.

Optionally, the transceiver 2010 is further configured to: send the first parameter information to the network device, so that the network device optimizes the topology structure according to the first parameter information.

Optionally, the transceiver 2010 is further configured to: Send the first parameter information to the network device.

Optionally, the transceiver also is configured to:

if the indication includes a preset indication, and the RLF is detected for the first node, send a failure cause indication to the network device;

Wherein, the failure cause indication is used to indicate that the RLF reason of the first node is the received preset indication, or that RLF is detected for the second node;

The preset indication includes at least one of the first indication, the second indication, the fourth indication, or the fifth indication.

Optionally, the sending the first parameter information to the network device includes:

Sending the obtained first parameter information to the network device every first preset time interval;

or

When receiving the request information sent by the network device, sending the obtained first parameter information to the network device;

or

When the preset first timer expires, sending the obtained the first parameter information to the network device;

or

For receiving the indication, if the number of sending times of N types of indications respectively reaches the threshold value of the N types of indications, sending the obtained first parameter information to the network device, wherein M is a number of types of the indications, N is an integer from 1 to M.

In a second aspect, when the device is applied to a second node, the processor 2000 is configured to read the computer program in the memory and perform the following operations:

in a case that a radio link failure (RLF) is detected for the second node, controlling the transceiver 2010 to send an indication related to RLF of the second node to at least one first node;

obtaining second parameter information for optimizing a topology structure according to the indication, wherein the topology structure includes the first node and the second node.

Optionally, when the device is applied to the second node, the processor 2000 is configured to read the computer program in the memory and perform the following operations:

when the RLF is detected for the second node, controlling the transceiver 2010 to send an indication related to the RLF of the second node to at least one first node, wherein the second node is a parent node of the first node;

Obtaining the indicated second parameter information.

Optionally, the indication includes at least one of the following indications:

a first indication, wherein the first indication is used to indicate that RLF is detected for the second node;

A second indication, wherein the second indication is used to indicate that the RLF is detected for second node and the second node is trying to recover a radio link;

A third indication, wherein the third indication is used to indicate that the second node succeeds recovery of the radio link;

a fourth indication, wherein the fourth indication is used to instruct the first node to perform RLF;

A fifth indication, where the fifth indication is used to indicate that the second node fails recovery of the radio link.

Optionally, the second parameter information includes at least one of the following first to tenth items:

each indication that is sent, a the number of times the indication was sent;

a cell identifier of a node receiving the indication;

a cell identifier of a node associated with each indication, wherein the associated node is a node other than the second node among the nodes to which the RLF indicated by the indication belongs;

a duration of the second type of timer, wherein the timing parameters of the second type of timer used to determine the duration are determined according to a second target moment, and the second target moment includes sending moments of various indications, a moment that the second node is connected to the third node, a moment that the second node sends the second parameter information to the network device, and a moment that a sending condition of the second node sending the second parameter information to the network device is triggered, a moment that RLF is detected for the second node, and the third node is the parent node where RLF is detected for the second node;

a measurement result of a primary cell at a second preset moment;

a measurement result of a neighboring cell at the second preset moment;

a radios network temporary identifier (C-RNTI) of the second node;

a cell identifier of the primary cell when RLF is detected for the second node;

a cell identifier of reestablishment of the second node;

a cell identifier of the reconnection of the second node.

Optionally, the second preset moment includes at least one of the following:

a moment that RLF is detected for the second node;

A moment that the sending condition for the second node to send the second parameter information to the network device is triggered;

a moment that the second node sends the second parameter information to the network device.

Optionally, the second parameter information includes at least one of the following:

each indication that is sent;

a number of times the indication was sent;

a cell identifier of a node receiving the indication;

a cell identifier of a node associated with each indication, wherein the associated node is a node other than the second node among the nodes to which the RLF indicated by the indication belongs;

a duration of the second type of timer, wherein the timing parameters of the second type of timer used to determine the duration are determined according to a second target moment, and the second target moment includes sending moments of various indications, a moment that the second node is connected to the third node, a moment that the second node sends the second parameter information to the network device, and a moment that a sending condition of the second node sending the second parameter information to the network device is triggered, a moment that RLF is detected for the second node, and the third node is the parent node where RLF is detected for the second node;

a measurement result of a primary cell at a second preset moment;

a measurement result of a neighboring cell at the second preset moment;

a radios network temporary identifier (C-RNTI) of the second node;

a cell identifier of the primary cell when RLF is detected for the second node;

a cell identifier of reestablishment of the second node;

a cell identifier of the reconnection of the second node.

Optionally, the second preset moment includes at least one of the following:

a moment that RLF is detected for the second node;

A moment that the sending condition for the second node to send the second parameter information to the network device is triggered;

a moment that the second node sends the second parameter information to the network device.

Optionally, the timing parameters of the second type of timer determined according to the second target time include at least one of the following:

If the starting timing moment in the timing parameters of the second type of timer is the moment that the second node is connected to the third node, or is the moment that the second node sends the first indication, then the end timing moment in the timing parameters of the second type of timer is the moment that the second node sends the second parameter information to the network device, or the moment that the sending condition that the second node sends the second parameter information to the network device is triggered, or the moment when RLF is detected for the second node;

If the starting timing moment in the timing parameters of the second type of timer is the sending time of the last first indication or the second indication before sending the third indication, then the end timing moment in the timing parameter of the second type of timer is the moment that the third indication is sent;

If the starting timing moment in the timing parameters of the second type of timer is the sending time of the last first indication or the second indication before sending the fifth indication, the end timing moment in the timing parameter of the second type of timer is the moment that the fifth indication is sent;

If the starting timing moment in the timing parameters of the second type of timer is the moment that RLF is detected for the second node, then the end timing moment in the timing parameters of the second type of timer is the moment that the second node sends the second parameter information to the network device, or the moment that the sending condition for the second node to send the second parameter information to the network device is triggered;

If the starting timing moment in the timing parameters of the second type of timer is the sending time of the last first indication or the second indication before sending the fourth indication, the end timing moment in the timing parameters of the second type of timer the moment that the fourth indication is sent.

Optionally, the transceiver 2010 is further configured to: send the second parameter information to the network device, so that the network device optimizes the topology structure according to the second parameter information.

Optionally, the transceiver 2010 is further configured to: send the second parameter information to the network device.

Optionally, the transceiver 2010 is further configured to: send third parameter information to the network device;

Wherein, the third parameter information includes at least one of the following:

A sending result indication recorded when RLF is detected for the second node, wherein the sending result indication is used to indicate whether the indication is sent to a child node of the second node;

Various indications sent to child nodes of the second node recorded when RLF is detected for the second node;

The cell identifier of the node that receives the indication, which is recorded when the RLF is detected for the second node.

Optionally, the sending the second parameter information to the network device includes:

Sending the obtained second parameter information to the network device at every second preset time interval;

or

When the request information sent by the network device has been received, sending the obtained second parameter information to the network device;

or

When the preset second timer expires, sending the obtained second parameter information to the network device;

or

For receiving the indication, if the number of sending times of the K indications respectively reaches the threshold value of the K indications, sending the obtained second parameter information to the network device, where M is a number of types of the indications, K is an integer from 1 to M.

In a third aspect, when the device is applied to a network device, the processor 2000 is configured to read the computer program in the memory and perform the following operations:

controlling the transceiver to receive parameter information for optimizing a topology structure, the parameter information is sent by a first node and/or a second node included in the topology structure, the second node is a parent node of the first node;

optimizing the topology structure according to the parameter information.

Optionally, when the device is applied to a network device, the processor 2000 is configured to read the computer program in the memory and perform the following operations:

Controlling the transceiver to receive parameter information related to an indication that a radio link failure RLF is detected for the second node, the parameter information is sent by the first node and/or the second node, and the second node is the parent node of the first node;

optimizing the topology structure according to the parameter information.

Wherein, in FIG. 20, the bus architecture may include any number of interconnected buses and bridges, specifically various circuits of one or more processors represented by the processor 2000 and the memory represented by the memory 2020 are linked together. The bus architecture can also link together various other circuits such as peripherals, voltage regulators, and power management circuits, etc., which are well known in the art and therefore will not be further described herein. The bus interface provides the interface. The transceiver 2010 may be a plurality of elements, including a transmitter and a receiver, providing a unit for communicating with various other devices over transmission medium, including wireless channels, wired channels, optical cables, and other transmission medium. The processor 2000 is responsible for managing the bus architecture and general processing, and the memory 2020 can store data used by the processor 2000 when performing operations.

The processor 2000 may be a central processor (CPU), an application specific integrated circuit (ASIC), a field programmable gate array (FPGA) or a complex programmable logic device (CPLD), the processor can also adopt a multi-core architecture.

What needs to be explained here is that the above-mentioned network device provided by the embodiments of the present application can implement all the method steps implemented by the above-mentioned method embodiments, and can achieve the same technical effect. The same parts and beneficial effects are not described in detail.

The embodiment of the present application also provides a processor-readable storage medium, the processor-readable storage medium stores a computer program, and the computer program is used to make the processor execute the above-mentioned information obtaining method.

The processor-readable storage medium can be any available medium or data storage device that can be accessed by a processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state drive (SSD)), etc.

Those skilled in the art should understand that the embodiments of the present application may be provided as methods, systems, or computer program products. Accordingly, the present application can take the form of an entirely hardware embodiment, an entirely software embodiment, or an embodiment combining software and hardware aspects. Furthermore, the present application may take the form of a computer program product embodied on one or more computer-usable storage medium (including but not limited to magnetic disk storage, optical storage, etc.) having computer-usable program code embodied therein.

The present application is described with reference to flowchart illustrations and/or block diagrams of methods, apparatus (systems), and computer program products according to embodiments of the present application. It should be understood that each procedure and/or block in the flowchart and/or block diagrams, and combinations of procedures and/or blocks in the flowchart and/or block diagrams can be implemented by computer-executable instructions. These computer-executable instructions can be provided to a general purpose computer, special purpose computer, embedded processor, or processor of other programmable data processing equipment to produce a machine, such that instructions executed by the processor of the computer or other programmable data processing equipment produce means for realizing the functions specified in one or more procedures of a flowchart and/or one or more blocks of a block diagram.

These processor-executable instruction may also be stored in a processor-readable memory capable of directing a computer or other programmable data processing device to operate in a specific manner, such that the instructions stored in the processor-readable memory produce a manufacturing product, the instruction device realizes the function specified in one or more procedures of the flow chart and/or one or more blocks of the block diagram.

These processor-executable instructions can also be loaded onto a computer or other programmable data processing device, causing a series of operational steps to be performed on the computer or other programmable device to produce a computer-implemented processing. The executed indications provide steps for implementing the functions specified in the flowchart procedure or procedures and/or block diagram procedures or blocks.

The device embodiments described above are only illustrative, and the units described as separate components may or may not be physically separated, and the components shown as units may or may not be physical units, that is, they may be located in one place, or it can be distributed to multiple network elements. Part or all of the modules can be selected according to actual needs to achieve the purpose of the solution of this embodiment. It can be understood and implemented by those skilled in the art without any creative work.

The various component embodiments of the present application may be implemented in hardware, or in software modules running on one or more processors, or in a combination thereof. Those ordinary skilled in the art should understand that a microprocessor or a digital signal processor (DSP) may be used in practice to implement some or all functions of some or all components in the computing processing device according to the embodiments of the present application. The present application can also be implemented as an apparatus or apparatus program (e.g., computer program and computer program product) for performing a part or all of the methods described herein. Such a program realizing the present application may be stored on a computer-readable medium, or may have the form of one or more signals. Such a signal may be downloaded from an Internet site, or provided on a carrier signal, or provided in any other form.

Figure 21:
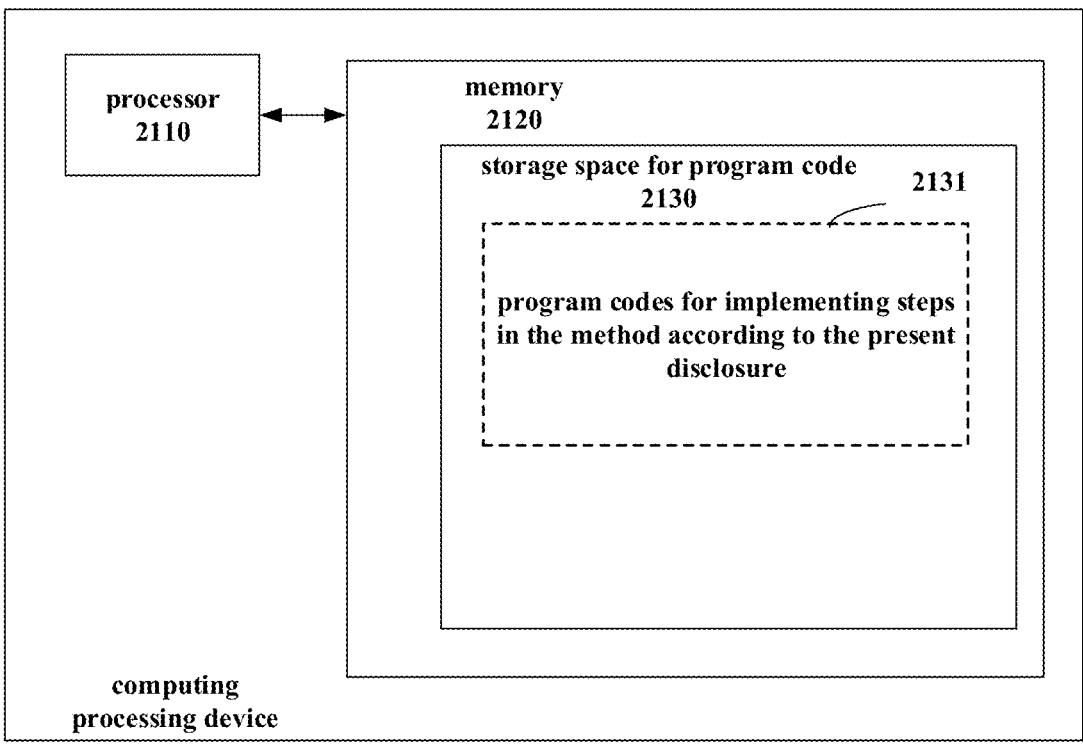
FIG. 21 schematically illustrates a block diagram of a computing processing device for performing methods according to the present application.
Figure 22:
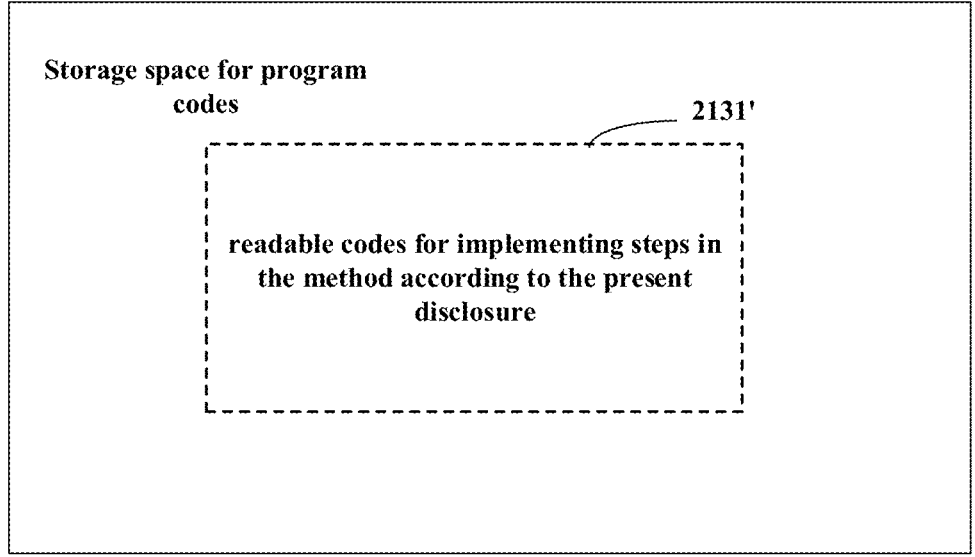
FIG. 22 schematically shows a storage unit for holding or carrying program codes for realizing the method according to the present application.

For example, FIG. 21 illustrates a computing processing device that may implement methods according to the present application. The computing processing device conventionally includes a processor 2110 and a computer program product or computer readable medium in the form of memory 2120. Memory 2120 may be electronic memory such as flash memory, Electrically Erasable Programmable Read Only Memory (EEPROM), EPROM, hard disk, or ROM. The memory 2120 has a storage space 2130 for program code 2131 for performing any method steps in the methods described above. For example, the storage space 2130 for program codes may include respective program codes 2131 for respectively implementing various steps in the above methods. These program codes can be read from or written into one or more computer program products. These computer program products include program code carriers such as hard disks, compact disks (CDs), memory cards or floppy disks. Such a computer program product is typically a portable or fixed storage unit as described with reference to FIG. 22. The storage unit may have storage segments, storage spaces, etc. arranged similarly to the memory 2120 in the computing processing device of FIG. 21. The program code can be compressed in a suitable form. Typically, the storage unit includes computer readable code 2131', i.e. code readable by, for example, a processor such as 2110, which code, when executed by a computing processing device, causes the computing processing device to perform each step of the above-described method.

Reference herein to "one embodiment," "an embodiment," or "one or more embodiments" means that a particular feature, structure, or characteristic described in connection with the embodiment is included in at least one embodiment of the present application. Additionally, please note that examples of the word "in one embodiment" herein do not necessarily all refer to the same embodiment.

In the description provided herein, numerous specific details are set forth. However, it is understood that embodiments of the present application may be practiced without these specific details. In some instances, well-known methods, structures and techniques have not been shown in detail in order not to obscure the understanding of this description.

In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The application can be implemented by means of hardware comprising several distinct elements, and by means of a suitably programmed computer. In a unit claim enumerating several means, several of these means can be embodied by one and the same item of hardware. The use of the words first, second, and third, etc. does not indicate any order. These words can be interpreted as names.

It is obvious that those ordinary skilled in the art can make various changes and modifications to the present application without departing from the spirit and scope of the present application. Thus, if these modifications and variations of the present application fall within the scope of the claims of the present application and equivalent art thereof, the present application also intends to include these modifications and variations.

What is claimed is:

1. An information obtaining method, applied to a first node, and comprising:

in a case that a radio link failure (RLF) is detected for a second node, receiving an indication related to the RLF of the second node sent by the second node, wherein the second node is a parent node of the first node;

obtaining first parameter information of the indication;

sending the first parameter information to a network device;

wherein the sending the first parameter information to the network device includes:

sending obtained first parameter information to the network device every first preset time interval;

or when receiving request information sent by the network device, sending the obtained first parameter information to the network device;

or when a preset first timer expires, sending the obtained the first parameter information to the network device;

or for received indications, if a number of sending times of N types of indications respectively reaches threshold values of the N types of indications, sending the obtained first parameter information to the network device, wherein M is a number of types of the indications, N is an integer from 1 to M.

2. The information obtaining method according to claim 1, wherein the indication includes at least one of the following indications:

a first indication, wherein the first indication is used to indicate that the RLF is detected for the second node;

a second indication, wherein the second indication is used to indicate that the RLF is detected for the second node and the second node is trying to recover a radio link;

a third indication, wherein the third indication is used to indicate that second node succeeds recovery of the radio link;

a fourth indication, wherein the fourth indication is used to instruct the first node to perform the RLF; or a fifth indication, where the fifth indication is used to indicate that the second node fails recovery of the radio link.

3. The information obtaining method according to claim 2, further comprising:

if the indication includes a preset indication, and the RLF is detected for the first node, sending a failure cause indication to the network device;

wherein, the failure cause indication is used to indicate that an RLF reason of the first node is the received preset indication, or that the RLF is detected for the second node;

the preset indication includes at least one of the first indication, the second indication, the fourth indication, or the fifth indication.

4. The information obtaining method according to claim 1, wherein the first parameter information includes at least one of the following:

each indication that is received;

a number of times the indication was received;

a duration of a first type of timer, wherein a timing parameter of the first type of timer used to determine the duration is determined according to a first target moment, and the first target moment includes receiving moments of various indications, a moment that the first node is connected to the second node, a moment that the first node sends the first parameter information to a network device, and a moment that a sending condition of the first node sending the first parameter information to the network device is triggered, and a moment that the RLF is detected for the first node;

a measurement result of a primary cell at a first preset moment;

a measurement results of a neighboring cell at the first preset moment;

a radio network temporary identifier (C-RNTI) of the first node;

a cell identifier of the second node;

a primary cell identifier when the RLF occurs;

a cell identifier of reestablishment of the first node; or a cell identifier of reconnection of the first node.

5. The information obtaining method according to claim 4, wherein the first preset moment includes at least one of the following:

a moment that the RLF is detected for the first node;

a moment that the sending condition of the first node sending the first parameter information to the network device is triggered; or a moment that the first node sends the first parameter information to the network device.

6. The information obtaining method according to claim 4, wherein the timing parameter of the first type of timer determined according to the first target moment include at least one of the following:

if a starting timing moment in the timing parameter of the first type of timer is the moment that the first node is connected to the second node, or is the moment that the first node receives a first indication, then an end timing moment in the timing parameter of the first type of timer is the moment that the first node sends the first parameter information to the network device, or the moment that the sending condition of the first node sending the first parameter information to the network device is triggered, or the moment that the RLF is detected for the first node;

if the starting timing moment in the timing parameter of the first type of timer is a receiving moment of a last first indication or second indication before receiving a third indication, the end timing moment in the timing parameter of the first type of timer is a moment that the third indication is received;

if the starting timing moment in the timing parameter of the first type of timer is a receiving moment of the last first indication or second indication before receiving a fifth indication, the end timing moment in the timing parameter of the firs type of timer is a moment that the fifth indication is received;

if the starting timing moment in the timing parameter of the first type of timer is the moment that the RLF is detected for the first node or a moment that a fourth indication is received, the end timing moment in the timing parameter of the first type of timer is the moment that the first node sends the first parameter information to the network device, or the moment that the sending condition of the first node sending the first parameter information to the network device is triggered; or if the starting timing moment in the timing parameter of the first type of timer is the receiving moment of the last first indication or second indication before receiving the fourth indication, the end timing moment in the timing parameter of the first type of timer is the moment that the fourth indication is received.

7. A node, wherein the node is used as a first node and the node includes a memory, a transceiver, and a processor, the memory is used to store computer programs; the transceiver is used to send and receive data under the control of the processor; the processor is used to read the computer programs in the memory and perform the information obtaining method according to claim 1.

8. An information obtaining method, applied to a second node, and comprising:

in a case that a radio link failure (RLF) is detected for the second node, sending an indication related to the RLF of the second node to at least one first node, wherein the second node is a parent node of the first node;

obtaining second parameter information of the indication;

sending the second parameter information to a network device;

wherein the sending the second parameter information to the network device comprises:

sending obtained second parameter information to the network device at every second preset time interval; or when request information sent by the network device has been received, sending the obtained second parameter information to the network device; or when a preset second timer expires, sending the obtained second parameter information to the network device; or for received indications, if a number of sending times of K types of indications respectively reaches threshold values of the K types of indications, sending the obtained second parameter information to the network device, wherein M is a number of types of the indications, K is an integer from 1 to M.

9. The information obtaining method according to claim 8, wherein the indication includes at least one of the following indications:

a first indication, wherein the first indication is used to indicate that the RLF is detected for the second node;

a second indication, wherein the second indication is used to indicate that the RLF is detected for second node and the second node is trying to recover a radio link;

a third indication, wherein the third indication is used to indicate that second node succeeds recovery of the radio link;

a fourth indication, wherein the fourth indication is used to instruct the first node to perform the RLF; or a fifth indication, where the fifth indication is used to indicate that the second node fails recovery of the radio link.

10. The information obtaining method according to claim 9, further comprising:

sending third parameter information to the network device;

wherein, the third parameter information includes at least one of the following:

a sending result indication recorded when the RLF is detected for the second node, wherein the sending result indication is used to indicate whether the indication is sent to a child node of the second node;

various indications sent to the child node of the second node and recorded when the RLF is detected for the second node; or a cell identifier of a node that receives the indication, which is recorded when the RLF is detected for the second node.

11. The information obtaining method according to claim 8, wherein the second parameter information includes at least one of the following:

each indication that is sent, a number of times the indication was sent;

a cell identifier of a node receiving the indication;

a cell identifier of a node associated with each indication, wherein the associated node is a node other than the second node among nodes to which the RLF indicated by the indication belongs;

a duration of a second type of timer, wherein a timing parameter of the second type of timer used to determine the duration is determined according to a second target moment, and the second target moment includes sending moments of various indications, a moment that the second node is connected to a third node, a moment that the second node sends the second parameter information to a network device, and a moment that a sending condition of the second node sending the second parameter information to the network device is triggered, a moment that the RLF is detected for the second node, and the third node is a parent node of the second node where the RLF occurs;

a measurement result of a primary cell at a second preset moment;

a measurement result of a neighboring cell at the second preset moment;

a radio network temporary identifier (C-RNTI) of the second node;

a cell identifier of the primary cell when the RLF is detected for the second node;

a cell identifier of reestablishment of the second node; or a cell identifier of reconnection of the second node.

12. The information obtaining method according to claim 11, wherein the second preset moment includes at least one of the following:

a moment that the RLF is detected for the second node;

a moment that the sending condition of the second node sending the second parameter information to the network device is triggered; or a moment that the second node sends the second parameter information to the network device.

13. The information obtaining method according to claim 11, wherein the timing parameter of the second type of timer determined according to the second target moment include at least one of the following:

if a starting timing moment in the timing parameter of the second type of timer is a moment that the second node is connected to a third node, or is the moment that the second node sends the first indication, then an end timing moment in the timing parameter of the second type of timer is the moment that the second node sends the second parameter information to the network device, or the moment that the sending condition that the second node sends the second parameter information to the network device is triggered, or the moment that the RLF is detected for the second node;

if the starting timing moment in the timing parameter of the second type of timer is a sending time of a last first indication or second indication before sending the third indication, then the end timing moment in the timing parameter of the second type of timer is the moment that the third indication is sent;

60 if the starting timing moment in the timing parameter of the second type of timer is the sending time of the last first indication or second indication before sending the fifth indication, the end timing moment in the timing parameter of the second type of timer is the moment that the fifth indication is sent;

if the starting timing moment in the timing parameter of the second type of timer is the moment that the RLF is detected for the second node, then the end timing moment in the timing parameter of the second type of timer is the moment that the second node sends the second parameter information to the network device, or the moment that the sending condition of the second node sending the second parameter information to the network device is triggered; or if the starting timing moment in the timing parameter of the second type of timer is the sending time of the last first indication or second indication before sending the fourth indication, the end timing moment in the timing parameter of the second type of timer the moment that the fourth indication is sent.

14. A node, wherein the node is used as a second node; and the node includes a memory, a transceiver, and a processor:

the memory is used to store computer programs; the transceiver is used to send and receive data under the control of the processor; the processor is used to read the computer programs in the memory and perform the information obtaining method according to claim 8.

* * * * *